US00RE44952E

(19) United States
(12) Reissued Patent
Tsukamoto et al.

(10) Patent Number: US RE44,952 E
(45) Date of Reissued Patent: *Jun. 17, 2014

(54) CONTROLLED-ACCESS BROADCAST SIGNAL RECEIVING SYSTEM

(75) Inventors: Junichi Tsukamoto, Tokyo (JP); Koichi Goto, Kanagawa (JP); Shinichi Fukushima, Kanagawa (JP)

(73) Assignee: Sony Corporation, Tokyo (JP)

( * ) Notice: This patent is subject to a terminal disclaimer.

(21) Appl. No.: 10/320,264

(22) Filed: Dec. 16, 2002

Related U.S. Patent Documents

Reissue of:
(64) Patent No.: 5,796,828
Issued: Aug. 18, 1998
Appl. No.: 08/499,332
Filed: Jul. 7, 1995

U.S. Applications:
(63) Continuation of application No. 09/641,611, filed on Aug. 17, 2000, now Pat. No. Re. 38,007, which is an application for the reissue of Pat. No. 5,796,828.

(30) Foreign Application Priority Data

Jul. 8, 1994 (JP) ..... 6-180637

(51) Int. Cl.
*H04N 7/167* (2011.01)
*H04L 9/00* (2006.01)
*H04L 9/32* (2006.01)

(52) U.S. Cl.
USPC ..... 380/203; 348/E5.004; 348/E5.007; 348/E7.056; 348/E7.061; 386/E5.004; 705/57

(58) Field of Classification Search
USPC ..... 380/200–242, 277–286, 259; 705/50–59; 713/150, 160–181, 200; 386/99, 94, 95, E5.004; 348/E5.004, 348/E5.007, E7.056, E7.061; 359/118; 725/66, 114; 715/513; 709/217, 229; 707/9, 10
See application file for complete search history.

(56) References Cited

U.S. PATENT DOCUMENTS 4,030,128 A * 6/1977 Perret ..... 380/204
4,465,901 A 8/1984 Best (Continued)

FOREIGN PATENT DOCUMENTS

DE 43 34 931 4/1994
EP 0 267 039 5/1988

(Continued)

OTHER PUBLICATIONS

Abyss: An Architecture for Software Protection; Steve R. White and Liam Comerford; IEEE Transactions on Software Engineering, vol. 16, No. 6, Jun. 1990; pp. 619-629.

(Continued)

*Primary Examiner* — Bernarr E Gregory
(74) *Attorney, Agent, or Firm* — Frommer Lawrence & Haug LLP; William S. Frommer

(57) ABSTRACT

An apparatus and method for transferring from a broadcaster to a receiver a limited reproduction right in data. A signal indicating the limited reproduction right is transmitted by the broadcaster and stored by the receiver with the data. The receiver reproduces and processes the data as a function of this signal.

207 Claims, 8 Drawing Sheets

(56) References Cited

U.S. PATENT DOCUMENTS

| | | | | | |
|---|---|---|---|---|---|
| 4,506,387 | A | * | 3/1985 | Walter | 725/114 |
| 4,649,510 | A | * | 3/1987 | Schmidt | 713/200 |
| 4,658,093 | A | * | 4/1987 | Hellman | 705/52 |
| 4,700,386 | A | * | 10/1987 | Kohn | 380/242 |
| 4,817,140 | A | * | 3/1989 | Chandra et al. | 705/55 |
| 4,868,736 | A | | 9/1989 | Walker | |
| 4,890,320 | A | * | 12/1989 | Monslow et al. | 380/211 |
| 4,916,737 | A | * | 4/1990 | Chomet et al. | 380/233 |
| 4,930,158 | A | * | 5/1990 | Vogel | 386/94 |
| 4,945,563 | A | * | 7/1990 | Horton et al. | 380/203 |
| 4,947,429 | A | * | 8/1990 | Bestler et al. | 380/241 |
| 4,975,951 | A | * | 12/1990 | Bennett | 380/231 |
| 5,014,234 | A | | 5/1991 | Edwards, Jr. | |
| 5,054,064 | A | * | 10/1991 | Walker et al. | 380/239 |
| 5,109,413 | A | * | 4/1992 | Comerford et al. | 705/54 |
| 5,151,782 | A | * | 9/1992 | Ferraro | 725/66 |
| 5,166,886 | A | | 11/1992 | Molnar et al. | |
| 5,204,897 | A | * | 4/1993 | Wyman | 705/59 |
| 5,260,999 | A | * | 11/1993 | Wyman | 705/59 |
| 5,319,705 | A | * | 6/1994 | Halter et al. | 705/54 |
| 5,381,480 | A | * | 1/1995 | Butter et al. | 380/259 |
| 5,400,402 | A | * | 3/1995 | Garfinkle | 380/231 |
| 5,428,529 | A | * | 6/1995 | Hartrick et al. | 715/513 |
| 5,615,264 | A | * | 3/1997 | Kazmierczak et al. | 705/52 |
| 5,619,570 | A | * | 4/1997 | Tsutsui | 705/52 |
| 5,625,690 | A | * | 4/1997 | Michel et al. | 705/53 |
| 5,627,655 | A | * | 5/1997 | Okamoto et al. | 380/203 |
| 5,634,012 | A | * | 5/1997 | Stefik et al. | 705/39 |
| 5,689,560 | A | * | 11/1997 | Cooper et al. | 705/52 |
| 5,734,823 | A | * | 3/1998 | Saigh et al. | 709/229 |
| 5,734,891 | A | * | 3/1998 | Saigh | 707/10 |
| 5,764,762 | A | * | 6/1998 | Kazmierczak et al. | 705/52 |
| 5,765,152 | A | * | 6/1998 | Erickson | 707/9 |
| 5,778,140 | A | * | 7/1998 | Okamoto et al. | 380/203 |
| 6,135,646 | A | * | 10/2000 | Kahn et al. | 709/217 |
| 6,253,193 | B1 | * | 6/2001 | Ginter et al. | 705/57 |

FOREIGN PATENT DOCUMENTS

| | | |
|---|---|---|
| EP | 0 268 139 | 5/1988 |
| EP | 0 461 029 | 12/1991 |
| EP | 0 498 617 | 8/1992 |
| EP | 0 601 500 | 6/1994 |
| GB | 2 272 822 | 5/1994 |

OTHER PUBLICATIONS

Abyss: A Trusted Architecture for Software Protection; Steve R. White and Liam Comerford; Proc. of IEEE, "Symposium on Security & Privacy"; 1987; pp. 38-51.

S.R. White et al., "Abyss: A Trusted Architecture for Software Protection"; IBM Thomas J. Watson Research Center, 1987 IEEE, pp. 38-51.

Patent Abstracts of Japan, publication No. 63129564 dated Jun. 1, 1988.

Anonymous: "User archiving by counting the number of times that information has been reproduced by a reproducing apparatus", Research Disclosure, Mason Publications, Hampshire, GB, vol. 361, No. 50, May 1, 1994, XP007119778.

Vigarie, J. P., "A device for real-time modification of access conditions in a D2-MAC/Packet Eurocrypt signal: The Transcontroller". Proceedings of the International Television Symposium and Technical Exhibition, Montreux, Jun. 10-15, 1993. Cable TV sessions; [Proceedings of the International Television Symposium and Technical Exhibition], Geneve, CCITT, CH, vol. Symp. 18, May 10, 1993 pp. 761-769, XP000379391.

* cited by examiner

CONTROLLED-ACCESS BROADCAST SIGNAL RECEIVING SYSTEM

Matter enclosed in heavy brackets [ ] appears in the original patent but forms no part of this reissue specification; matter printed in italics indicates the additions made by reissue.

*CROSS REFERENCE TO RELATED APPLICATIONS*

*More than one application has been filed to reissue U.S. Pat. No. 5,796,828. This is a continuation of reissue application Ser. No. 09/641,611, filed Aug. 17, 2000, now U.S. Pat. No. Re. 38,007, which was an application to reissue 08/499,332, filed Jul. 7, 1995, now U.S. Pat. No. 5,796,828. In addition, application Ser. No. 12/123,786, now U.S. Pat. No. Re. 41,709, was filed May 20, 2008 as a continuation of the instant application.*

BACKGROUND OF THE INVENTION

This invention relates to video data communication in which a limited reproduction right in video data is transferred between a broadcaster and a receiver.

Commonly, video programming is transmitted from a broadcaster to a user via a satellite or cable communications system. In some systems, users are able to request, and broadcasters provide, select video programming through the use of individually addressable decoding receivers. The user's decoder is activated upon receipt of the user's address which is transmitted along with the requested video programming.

The drawback of such systems is that the user is often able to record the requested video programming for later reproduction. This later reproduction occurs without any royalty payment to the broadcaster or other holder of copyrights in the video programming. Further, the recorded video programming can be disseminated by the user to others for additional reproductions without corresponding royalty payments.

OBJECTS AND SUMMARY OF THE INVENTION

An object of the present invention is to provide a system for the transfer between a broadcaster and a user of a limited reproduction right in transmitted data.

Another object of the present invention is to enable a user to request from a broadcaster a particular limited reproduction right in a selected video program.

Yet another object of the present invention is to prevent the reproduction of transmitted data by a user without adequate payment for each reproduction.

In accordance with the present invention, an apparatus for receiving, recording, and reproducing data signals is provided. A receiver receives transmitted data signals along with an access-control signal, the latter serving to control subsequent processing of the received data signals. The processed data signals are recorded in a first storage medium, and the access-control signal is stored in a second storage medium. When the processed data signals subsequently are reproduced from the first storage medium the access-control signal is retrieved from the second storage medium, and is used to control the reprocessing of the reproduced data signals.

The above, and other objects, features and advantages of the present invention will become apparent from the following detailed description of illustrative embodiments when read in conjunction with the accompanying drawings in which the same components are identified by the same reference numerals.

DETAILED DESCRIPTION OF THE PREFERRED EMBODIMENTS

Figure 1:
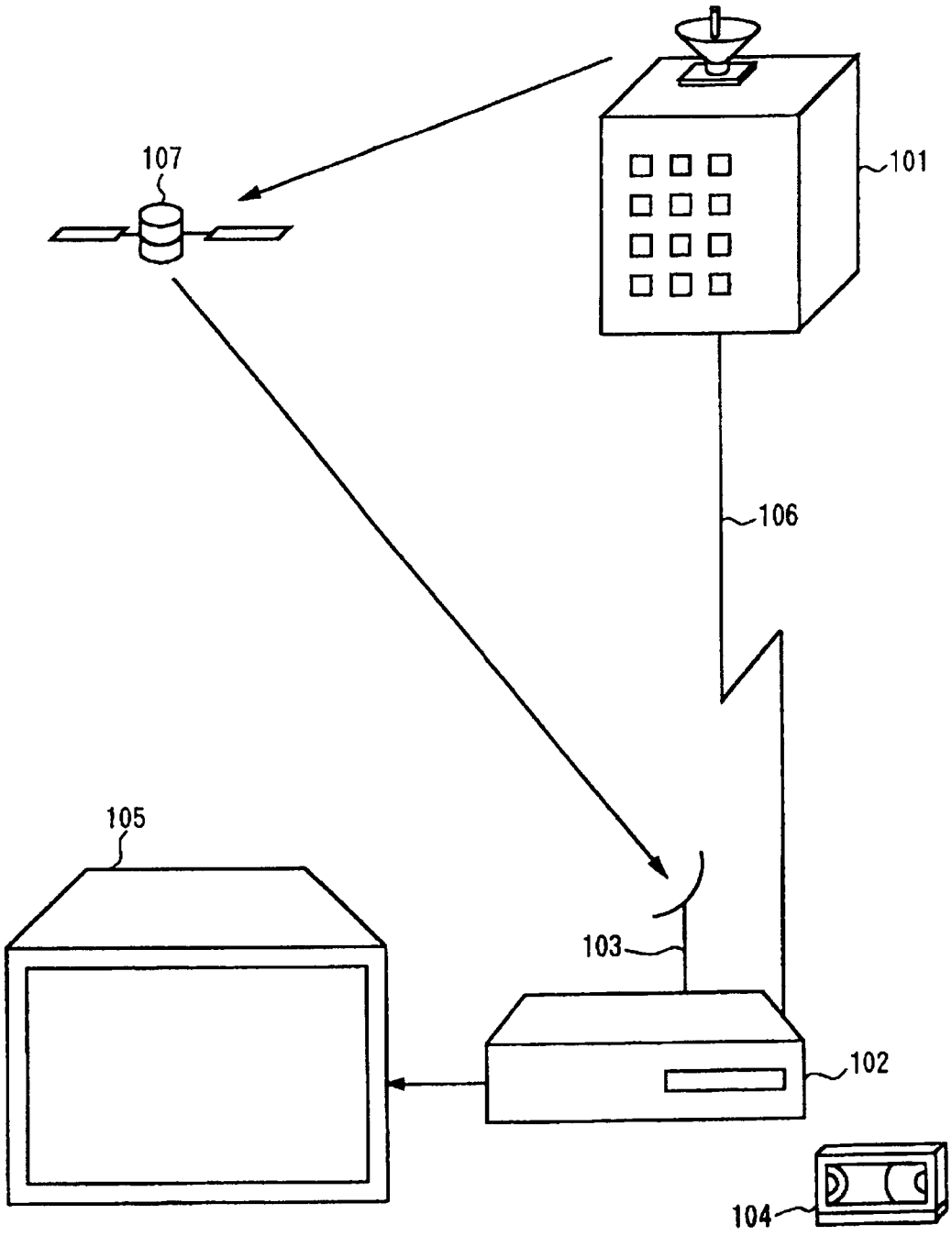
FIG. 1 is a schematic diagram of a satellite broadcast system in which the present invention finds ready application.

FIG. 1 illustrates a satellite broadcast system incorporating a controlled-access broadcast signal receiving system 102 according to the present invention. As explained in the following, it is preferred that the controlled-access broadcast signal receiving system 102 be specifically adapted to receive and process digital video data. Nevertheless, it should be appreciated that this system can be modified to accommodate other digital or analog signals without departing from the scope of the invention. As it is understood that the system can easily be implemented to accommodate other types of data, the following explanation is specifically directed towards a controlled-access broadcast digital video signal receiving system 102.

The satellite television broadcasting system comprises a broadcasting station 101, controlled-access broadcast digital video signal receiving system 102, an antenna 103, a video display 105, a communication link 106, and a satellite 107. Broadcasting station 101 broadcasts video signals and access-control signals to the controlled-access broadcast digital video signal receiving system 102 which processes the video signals as a function of the access-control signals.

Broadcasting station 101 transmits video and access-control signals to receiving system 102 via communication link 106, satellite 107, or both. Communication link 106 is a signal transmission medium that couples broadcasting station 101 and receiving system 102. Preferably, communication link 106 comprises a conventional telephone line. Alternatively, communication link 106 includes any of a number of other transmission media, such as a land-based broadcast system, a cable television system, a fiber optic network or the like.

Satellite 107 is a satellite broadcast signal relay station that receives signals from broadcasting station 101 and relays the signals to antenna 103. Antenna 103 receives signals from satellite 107 and supplies the signals to receiving system 102. Alternatively, satellite 107 can be replaced by any of a number of other transmission media, such as a land-based broadcast system, a cable television system, a fiber optic network or the like.

Receiving system 102 receives video signals and access-control signals supplied by broadcasting station 101 and processes (e.g. descrambles, decodes, and records) the signals. Typically, video signals are recorded on a storage medium and subsequently reproduced for display. Alternatively, video signals are recorded on a storage medium and processed for display to a user substantially simultaneously. Access-control signals are stored in a memory or, alternatively, recorded on a storage medium which may be the same storage medium on which the video signals are recorded. In a preferred embodiment, receiving system 102 is adapted to receive a storage cassette 104 containing a tape on which video and access-control signals are recorded. Alternatively, storage cassette 104 comprises a tape for storing video signals and a separate memory, such as a memory chip included therein, for storing access-control signals. In other embodiments, receiving system 102 is adapted to receive any of a number of other storage media, such as a video disc, a magnetic media diskette, a compact disc or the like. Video display 105, which preferably is a conventional display device, is coupled to and receives video signals from receiving system 102 for display to a user.

In a preferred recording mode of operation, broadcasting station 101 transmits video signals to satellite 107 which relays the signals to antenna 103 from which the video signals are coupled to receiving system 102. Also, broadcasting station 101 transmits access-control signals through communication link 106 to the receiving system. Receiving system 102 processes and records the video signals as a function of the access-control signals.

In a preferred reproduction mode of operation, the receiving system retrieves the previously stored access-control signals and uses those access-control signals to control the reproduction and processing of the previously recorded video signals. The video signals are supplied to video display 105 or to another peripheral device (not shown).

An alternate satellite television broadcasting system according to the present invention comprises each of the elements described above except that only one of communication link 106 and satellite 107 is included. The alternate system is otherwise interconnected as in the above-described embodiment. Through the single transmission medium, broadcasting station 101 transmits both video signals and access-control signals to receiving system 102.

In another variation, receiving system 102 transmits program requests, payment information, or other signals to broadcasting station 101 through one of the transmission media. Typically, communication link 106 is used for this purpose.

Figure 2:
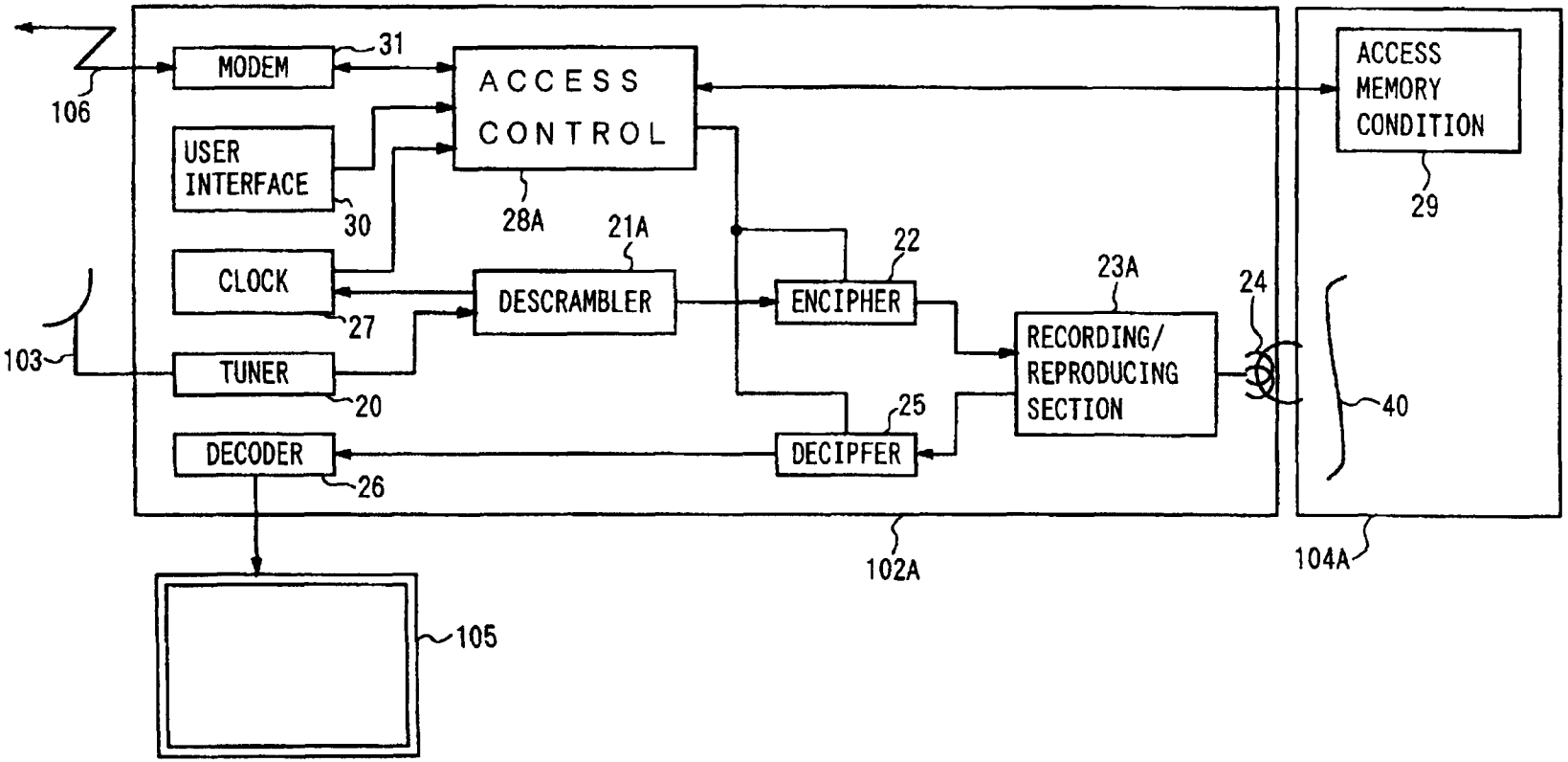
FIG. 2 is a block diagram of a controlled-access broadcast digital video signal receiving system according to one embodiment of the present invention.

A first embodiment of the controlled-access broadcast digital video signal receiving system 102 according to the present invention is illustrated in FIG. 2 as system 102A. Receiving system 102A, is adapted for receiving, descrambling, enciphering, recording, deciphering and decoding digital video signals; and is comprised of a tuner 20, a descrambler 21A, an encipherer 22, a recording/reproducing section 23A, a decipherer 25, a decoder 26, an access controller 28A, a user interface 30, and a modem 31.

Tuner 20 receives input digital video signals, selects particular digital video signals, and supplies the selected signals to descrambler 21A. Preferably, input digital video signals are satellite broadcast digital video signals acquired by satellite antenna 103 which is coupled to tuner 20. Alternatively, input digital video signals are acquired from another transmission medium that is coupled to tuner 20. Preferably, a user controls tuner 20 to select signals from among different input digital video signals. The selected video signals include a time reference signal and a date reference signal.

Descrambler 21A is coupled to tuner 20 and descrambles scrambled digital video signals supplied therefrom. As is well known in the art, transmitted video signals are commonly scrambled or coded by a signal provider to prevent unauthorized reception of the video signals. Descrambler 21A supplies an unscrambled version of the digital video signals to encipherer 22. Further, descrambler 21A is coupled to a clock 27 to supply the received time reference signal and the date reference signal thereto.

Encipherer 22 is coupled to descrambler 21A, recording/reproducing section 23A, and access controller 28A. When enabled by the access controller, encipherer 22 encrypts, according to an encryption key, descrambled video signals supplied by descrambler 21A to produce encrypted video signals. The encrypted video signals are supplied to recording/reproducing section 23A for recording. However, the encrypted video signals cannot be displayed by ordinary means. It is contemplated that the encryption key is pre-stored in encipherer 22, or is supplied by access controller 28A, or is included in the video signals or in the access-control signals supplied by broadcasting station 101. When disabled by access controller 28A, encipherer 22 passes descrambled video signals from descrambler 21A directly to section 23A without encryption.

Recording/reproducing section 23A, through a record/playback head 24, or the like, records on storage medium 40 video signals supplied by encipherer 22. Section 23A, through head 24, also reads previously recorded video signals from storage medium 40 and supplies the reproduced video signals to decipherer 25. Preferably, section 23A is a digital video tape recording/reproducing device (VTR) and storage medium 40 is a video tape. However, other types of storage media are contemplated, such as optical, magnetic or magneto-optic disc, solid-state memory, or the like.

Decipherer 25 is coupled to decoder 26 and, when enabled by access controller 28A, is adapted to decrypt, according to an encryption key, encrypted signals supplied by recording/reproducing section 23A. It is contemplated that the encryption key is prestored in decipherer 25, or is supplied thereto by access controller 28A, or is included in the video signals or the access-control signals supplied by broadcasting station 101, or is stored in storage medium 40, or is stored in access condition memory 29. When disabled, decipherer 25 passes video signals from recording/reproducing section 23A directly to decoder 26 without decryption.

As is well known in the art, video signals are commonly compressed or otherwise coded to facilitate their transmission through a transmission medium. Decoder 26 decodes such coded digital video signals as reproduced from storage medium 40 to produce uncoded digital video signals which are coupled to video display 105 for display. It is preferred that decoder 26 is adapted to decode digital video signals encoded in accordance with the Moving Picture Image Coding Experts Group (MPEG) standard.

Clock 27 is comprised of a clock device and a date device for tracking the time of day and the calendar date, respectively, known to those of ordinary skill in the art. Clock 27 is coupled to access controller 28A and supplies time signals and date signals thereto. The clock receives a time reference signal and a date reference signal from descrambler 21A and synchronizes its operation therewith.

User interface 30 is coupled to access controller 28A and supplies user input signals thereto. The user input signals are generated as a function of input supplied by a user to the user interface which may include a keyboard or user-operated switches. Typical user input signals include a command to display video signals, a command to record broadcast video signals, an authorization code, a request for a specific video program, and so on.

Modem 31 is coupled to access controller 28A and to communication link 106 and facilitates the communication of signals through the communication link between broadcasting station 101 (shown in FIG. 1) and the access controller. As communication link 106 is preferably a telephone line, modem 31 is preferably a conventional telephone line modem.

Access controller 28A is further coupled to an access condition memory 29. It will be appreciated that, as a function of the signals supplied to access controller 28A by clock 27, user interface 30, modem 31, and access condition memory 29, the access controller controls the operation of encipherer 22 and decipherer 25. As will be discussed in greater detail below, depending upon whether applicable conditions have been fulfilled, the access controller enables or disables the operation of encipherer 22 and decipherer 25. Access controller 28A stores access-control signals in and retrieves access-control signals from access condition memory 29. In an alternate embodiment, it is contemplated that the access controller 28A stores both access-control signals and the encryption keys of encipherer 22 and decipherer 25 in access condition memory 29.

Access-control signals indicate the conditions, if any, to be placed on the reproduction of the video component of the selected digital video signals. These conditions describe the circumstances under which a user may or may not reproduce the selected video signals. As a function of the access-control signals, the selected video signals recovered by descrambler 21A are processed prior to recording and processed again following reproduction. Depending on the particular conditions and circumstances, a user can be prevented entirely from accessing the selected digital video signals, given limited access to the signals, or given full access to the signals. Such conditions may include, but are not limited to, one or more of the following: (1) previous receipt of a payment signal from broadcasting station 101, (2) a numerical limit on the number of times particular video signals may be reproduced or displayed, (3) a temporal limit on the reproduction or display of video signals, and (4) previous receipt of a user authorization code. Preferably, the access-control signals are comprised of simple default values.

Also illustrated in FIG. 2 is storage cassette 104A which comprises access condition memory 29 and storage medium 40. Storage cassette 104A is, as a whole, removably connected to receiving system 102A. Access condition memory 29 stores access-control signals indicating the conditions, if any, to be placed on the reproduction and/or recording of video signals on storage medium 40. Preferably, access condition memory 29 is an integrated circuit RAM, integrated into storage cassette 104A but independent of storage medium 40, as has been proposed heretofore, and electrically connectable to access controller 28A. Storage medium 40 stores signals recorded thereon by head 24 and is preferably removably engaged therewith.

Operation of the embodiment of the controlled-access broadcast digital video signal receiving system 102A shown in FIG. 2 will be described below. An important feature of this embodiment is that access-control signals, corresponding to video signals that are to be recorded on or reproduced from storage medium 40, are stored in access condition memory 29. Access controller 28A controls the operation of encipherer 22 and decipherer 25 as a function of one or more of the access-control signal stored in access condition memory 29 and/or received from modem 31. In this manner, the encryption and decryption of video signals is controlled to prevent unauthorized reproduction of the video signals.

The configuration of the present invention is compatible with many different sequences of signal transfer between broadcasting station 101 and receiving system 102A. Examples of useful signal transfer sequences, implemented in different modes of operation of the present invention, will be described in detail below. Through the different modes of operation, video programs are securely transferred between a broadcaster and a consumer for recording, but the consumer's ability to display the programs can be subjected to limitations.

In a first video-on-demand mode, a user enters into user interface 30 a request for a specific video program. User interface 30 transmits this request to access controller 28A, which, in turn, communicates the user's request through modem 31 and communication link 106 to broadcasting station 101. The broadcasting station transmits the requested video program to satellite 107 which relays the video program to antenna 103 and supplies the video signals representing this program to tuner 20. It is expected that several video signals are coupled to tuner 20, which selects the particular video signals comprising the requested video program and supplies these selected video signals to descrambler 21A. The descrambler descrambles these broadcast video signals and supplies a descrambled version of the video signals to encipherer 22. Descrambler 21A also supplies a time reference signal and a date reference signal, which accompany the video program transmission, to clock 27.

Additionally, broadcasting station 101 communicates access-control signals through communication link 106 and modem 31 to access controller 28A for storage in access condition memory 29. The access-control signals serve to define the conditions or limitations, if any, upon the usage of the requested video program. In general, a user can either purchase or rent a particular video program from a broadcaster. In a prepayment method of purchase, a user pays for a video program and subsequently requests that the broadcaster transmit the program to the user's video receiving system. Broadcasting station 101 transmits the requested program and an access-control signal indicating that the video program can be unconditionally recorded and reproduced (FULL ACCESS). Access controller 28A stores the FULL ACCESS signal in access condition memory 29 to disable encipherer 22. Hence, descrambled video signals of the video program are supplied by descrambler 21A through encipherer 22, without encryption, to recording/reproducing section 23A, whereat the descrambled and unencrypted video signals are recorded on storage medium 40.

In a postpayment method of purchase, wherein a user elects to pay for a video program after it has been received by the user's receiving system, broadcasting station 101 transmits the particular video program to receiving system 102A along with an access-control signal indicating that the video program cannot be reproduced (NO REPRO). Access controller 28A stores the NO REPRO signal in access condition memory 29 and enables encipherer 22, causing it to encrypt, according to an encryption key, descrambled video signals of the video program supplied by descrambler 21A. Encipherer 22 supplies encrypted video signals to recording/reproducing section 23A, whereat the encrypted video signals are recorded on storage medium 40.

It is contemplated that the user subsequently purchases the video program from the broadcaster. Upon payment, broadcasting station 101 transmits an access-control signal to access controller 28A indicating that the recorded video program can be reproduced (REPRO OK), and this REPRO OK signal replaces the previously stored NO REPRO signal in memory 29. When the encrypted video signals subsequently are played back from storage medium 40, they are supplied to decipherer 25 which is enabled by the stored REPRO OK signal to decrypt the reproduced video signals.

In a second prepayment method of purchase, similar to the postpayment method, the user pays for the selected program prior to its transmission, but broadcasting station 101 first transmits the selected program to receiving system 102A along with a NO REPRO signal. Access controller 28A causes encipherer 22 to encrypt the video signals of the video program and the encrypted signals are recorded on storage medium 40 while the NO REPRO signal is stored in access condition memory 29. Upon completion of the video program transmission, broadcasting station 101 transmits a REPRO OK signal; and access controller 28A replaces the stored NO REPRO signal with the REPRO OK signal. Thus, the video program is recorded in encrypted form but the user can reproduce and decrypt the program an unlimited number of times. This second prepayment method has the advantage of producing video recordings that can only be reproduced in devices having compatible decryption capabilities.

Alternatively, a user can purchase the right to reproduce a video program a certain number (N) of times. The user thus "rents" the video program for N reproductions. In one mode, the user enters a request into user interface 30 to rent a video program for N reproductions. User interface 30 transmits the request to access controller 28A which forwards the request through modem 31 and communication link 106 to broadcasting station 101. Broadcasting station 101 transmits the requested video program along with an access-control signal indicating that the video program can only be reproduced N times (REPRO N TIMES). The access controller receives the REPRO N TIMES signal and stores it in access condition memory 29. The video program is received by tuner 20 and supplied to descrambler 21A which descrambles the video program and supplies descrambled video signals to encipherer 22. The encipherer, which is enabled by the access controller, encrypts the descrambled video signals, and supplies encrypted signals to recording/reproducing section 23A for recording on storage medium 40.

In another rental mode, wherein a user desires to rent a particular video program for a certain period of time, an access-control signal designating the period of time during which reproduction of the requested video program is authorized is supplied by the broadcasting system. For example, the user may request to rent a particular video program for a certain number of days (D). Receiving system 102A transmits this request via communication link 106 to broadcasting station 101. The broadcasting station calculates the date Y, as a function of D, on which the reproduction right should expire, and transmits the requested video program along with an access-control signal indicating that reproduction is allowed until date Y (REPRO UNTIL DATE Y). The access-control signal is received by receiving system 102A and stored in access condition memory 29. The access controller enables the operation of encipherer 22; and as described above, the requested video program is received, selected by tuner 20, descrambled, enciphered, and recorded in enciphered form. Subsequently, the encrypted video program is reproduced, deciphered (so long as the reproduction operation is performed prior to date Y) and displayed.

As another example, a user can request to rent a particular video program for a certain number of hours (H). Receiving system 102A transmits this request via communication link 106 to broadcasting station 101 which calculates the time T, as a function of H, when the reproduction right should expire, and transmits the requested video program along with an access-control signal indicating that reproduction is allowed until time T (REPRO UNTIL TIME T). The received access-control signal is stored in access condition memory 29; and the operation of encipherer 22 is enabled by access controller 28A. As described above, the requested video program is received, selected, descrambled, enciphered, and recorded in an enciphered form.

Of course, there are many different methods of expressing the terms of a rental. The preceding expressions are intended merely as examples to assist in explaining the present invention and not as limits thereon. Further examples of useful rental terms include: reproduction of a video program for a certain number of hours or of days, or for a period of time in the future.

Analogous to the prepayment and postpayment methods of purchase, each rental of a video program can be prepaid or postpaid by the user. When the rental is prepaid, broadcasting station 101 transmits the requested program and the access-control signal specifying the terms of the rental to receiving system 102A which processes the video program (i.e., selectively encrypts the video signals) and stores the access-control signal as described above.

In contrast, when the rental is postpaid, broadcasting station 101 transmits the requested program and a NO REPRO signal to receiving system 102A, which encrypts and records the video program and stores the NO REPRO signal as described above. Upon proper payment, broadcasting station 101 transmits the access-control signal specifying the terms of the rental to the receiving system which replaces the NO REPRO signal in access condition memory 29 with the newly-transmitted access-control signal.

In a further variation, a certain segment of the video program can be made available for reproduction by a user in a "preview" mode of operation. In this "preview" mode a user can view a selected portion of the requested video program and later decide whether or not to purchase or rent the entire video program. In an illustrative implementation of the preview mode, the access-control signal corresponding to the preview segment is a REPRO OK signal and the access-control signal corresponding to the entire video program is a NO REPRO signal.

In a second video-on-demand mode, a user requests video programming from a broadcaster to be transmitted at a later time, perhaps the following day. The video programming may be, for example, one or more video programs selected by the user or a number of video programs selected by the broadcaster. In the latter case, it is contemplated that the user initially selects a particular type of video programming or selects video programming provided by a particular video program supplier.

The request for "delayed" transmission of the video programming is entered by the user into user interface 30. User interface 30 transmits this request to access controller 28A which communicates the user's request through modem 31 and communication link 106 to broadcasting station 101.

Some period of time later, broadcasting station 101 transmits the requested video programming to satellite 107 which relays the video programming to antenna 103. Preferably, transmission of the video programming occurs during periods when broadcasters are "off-the-air" or during periods of low viewership of broadcast video signals. Antenna 103 receives the video programming and supplies the video signals to tuner 20 from which the particular video signals comprising the requested video programming are supplied to descrambler 21A which, in turn, supplies a descrambled version of the video signals to encipherer 22.

In this mode, broadcasting station 101 also transmits two access-control signals via communication link 106 and modem 31 to access controller 28A. One access-control signal indicates that the video programming is to be erased on a certain date Y (ERASE ON DATE Y) and the other access-control signal is the NO REPRO signal. Access controller 28A stores the ERASE ON DATE Y signal and the NO REPRO signal in access condition memory 29. Encipherer 22, when enabled, supplies encrypted video signals to recording/reproducing section 23A for recording on storage medium 40.

Subsequently, but prior to date Y, the user selects a video program from the requested video programming stored on storage medium 40 and pays the fee to rent the selected program for a particular rental term. Upon payment, broadcasting station 101 transmits the access-control signal indicating the appropriate rental condition to access controller 28A which replaces the previously stored NO REPRO signal in memory 29. Hence, the ERASE ON DATE Y signal remains stored in access condition memory 29.

Illustrative video signal reproduction modes of operation of receiving system 102A now will be described. The process is initiated when a user enters a command into user interface 30 to reproduce a prestored video program recorded on storage cassette 104A. The user interface transmits the command to access controller 28A which retrieves the access-control signal stored in access condition memory 29 of the storage cassette. The operation of decipherer 25 is controlled as a function of the particular access-control signal(s) that is retrieved.

If, for example, the retrieved signal is a FULL ACCESS signal, then access controller 28A disables decipherer 25. Recording/reproducing section 23A recovers video signals from storage medium 40 and supplies the reproduced video signals to decipherer 25, which passes the video signals to decoder 26. As described above, the reproduced video signals are unencrypted; and decoder 26 decodes the video signals and supplies uncoded video signals to video display 105.

If the NO REPRO signal is retrieved from access condition memory 29, access controller 28A disables the operation of decipherer 25. However unlike the FULL ACCESS signal case, the video signals stored on storage medium 40 are encrypted. Hence, recording/reproducing section 23A reproduces encrypted video signals which are supplied to decipherer 25 to be passed directly to decoder 26 without decryption. The decoder decodes the encrypted video signals to produce uncoded but encrypted video signals which are supplied to video display 105. As a result, the video display either cannot display the video signals at all or can only display a distorted version of the original video program.

As a further alternative, access controller 28A may retrieve a REPRO OK signal from access condition memory 29 to enable the operation of decipherer 25. Recording/reproducing section 23A reproduces the encrypted video signals stored on storage medium 40 and supplies the encrypted signals to enabled decipherer 25 which decrypts the video signals and supplies unencrypted video signals to decoder 26. The decoder decodes the video signals and supplies the resulting uncoded and decrypted video signals to video display 105 for display. Because the video signals are uncoded and decrypted, video display 105 displays the reproduced video program without distortion.

As yet another alternative, when access controller 28A retrieves a REPRO N TIMES signal from access condition memory 29, the access controller 28A determines whether the number N is greater than a predetermined threshold value (e.g. zero). If the number N is not greater than the threshold value, then access controller 28A disables operation of decipherer 25 and reproduction of the stored video signal proceeds as in the NO REPRO signal case. On the other hand, if the number N is greater than the threshold value, then access controller 28A enables decipherer 25 and reproduction of the stored video signal proceeds as in the REPRO OK signal case.

After the video signal is reproduced from storage medium 40, if the number N is greater than the threshold value, access controller 28A subtracts one from the value of N to produce a new value N and writes a new REPRO N TIMES signal, utilizing the new value N, into access condition memory 29 whereat the previously stored REPRO N TIMES signal is replaced by the new REPRO N TIMES signal. According to this procedure, the particular video signals stored in storage medium 40 to which the REPRO N TIMES signal corresponds are only reproduced the number of times represented by the number N. The value N stored in access condition memory 29 thus reflects the remaining number of permitted reproductions of the particular video signals. Since the access condition memory is provided in the same storage cassette 104A as storage medium 40, and the video signals are encrypted on the storage medium, the video signals can only be reproduced for display N times even if the cassette is loaded into another receiving system, at least until a new access-control signal is stored.

When, as described above, a video program is rented for only a certain period of time, access controller 28A retrieves the corresponding access-control signal from access condition memory 29 and also receives a clock signal and a date signal from clock 27. The clock signal and the date signal are compared to the retrieved access-control signal, and if the particular condition expressed in the access-control signal is satisfied such that reproduction is allowed, then decipherer 25 is enabled and reproduction of the stored video signals proceeds as in the REPRO OK case. However, if the condition expressed by the access-control signal is not satisfied such that reproduction of the video signals is not allowed, then the decipherer is disabled and reproduction of the stored video signals proceeds as described with respect to the NO REPRO signal.

For example, when access controller 28A retrieves a REPRO UNTIL DATE Y signal from access condition memory 29, it compares the date signal from clock 27 to the date Y. If the date from clock 27 is prior to date Y, then the access controller enables the operation of decipherer 25 to decrypt the reproduced, encrypted video signals. In a similar fashion, when the access controller retrieves a REPRO UNTIL TIME T signal from the access condition memory, it compares the time signal supplied by clock 27 with the time T. If the time indicated by the time signal is prior to time T, then reproduction of the stored video signals proceeds as described with respect to the REPRO OK signal.

In an analogous manner, when access controller 28A retrieves an ERASE ON DATE Y signal from access condition memory 29, it compares the date signal from clock 27 to the date Y. If the date indicated by clock 27 is the same as or past date Y, then the access controller controls recording/reproducing section 23A to erase the video signals stored on storage medium 40. A suitable control channel, or link, may be provided between access controller 28A and recording/reproducing section 23A.

An alternate embodiment of receiving system 102A additionally includes a connection between descrambler 21A and access controller 28A. Here, scrambled access-control signals that are transmitted by broadcasting station 101 along with the video signals are supplied to and descrambled by descrambler 21A from which they are coupled to the access controller. In this alternate embodiment, video signals are recorded and reproduced as described above, and encipherer 22 and decipherer 25 are selectively enabled and disabled in response to the received access-control signals in the same manner as has been discussed.

As will be appreciated by one of ordinary skill in the art, each of the abovedescribed modes of signal reproduction wherein the user has prepaid for the video programming can be achieved substantially simultaneously with the recording of the broadcast video signals. In such a mode of operation, recording/reproducing section 23A functions both to record the processed broadcast video signals and to supply the video signals to decipherer 25. Decipherer 25, controlled by access controller 28A, decrypts the video signals as a function of the access-control signal to be stored in access condition memory 29 and decoder 26 decodes the resulting video signals for immediate display on video display 105.

Figure 3:
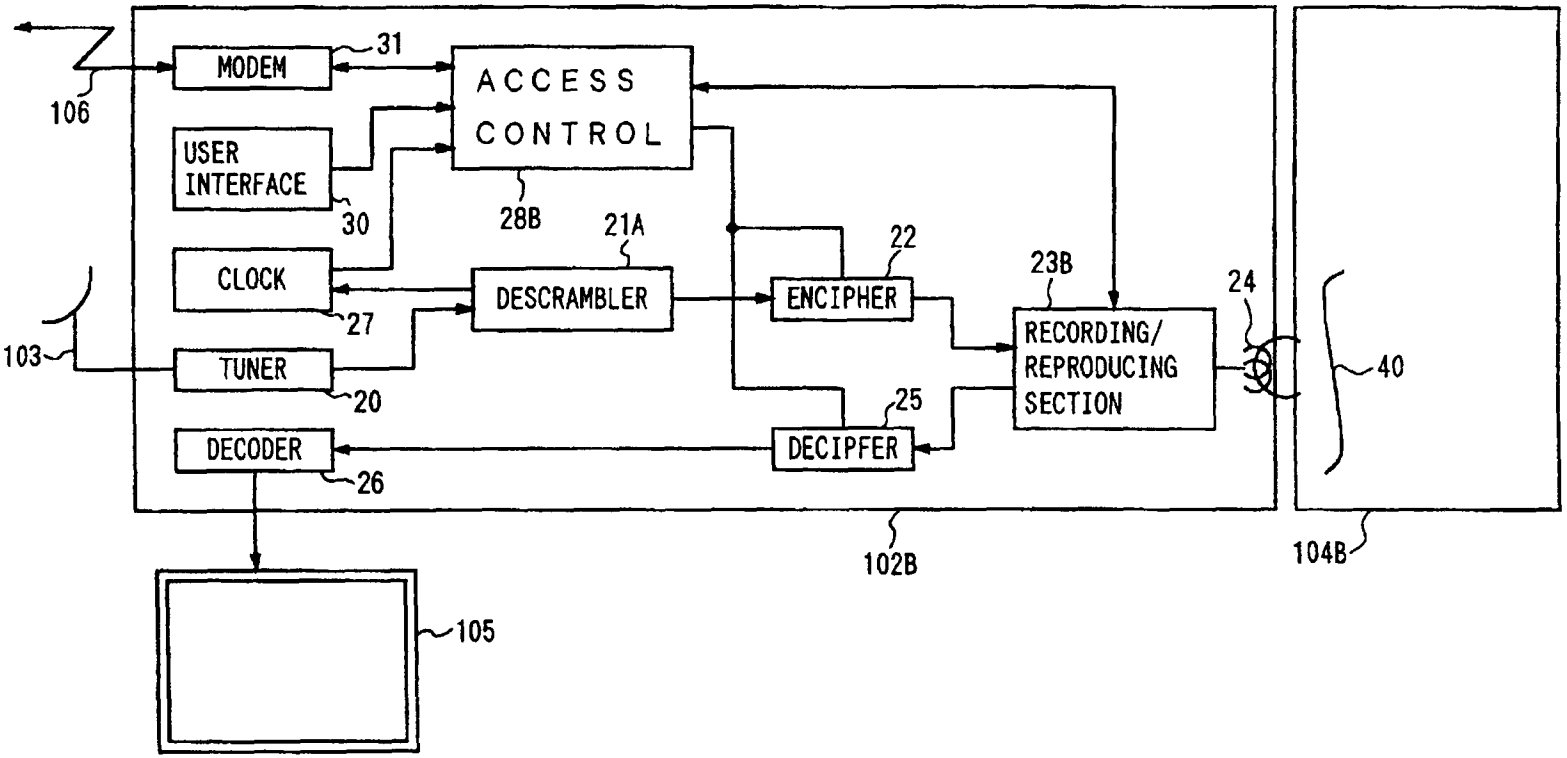
FIG. 3 is a block diagram of a controlled-access broadcast digital video signal receiving system according to another embodiment of the present invention.

Another embodiment of the controlled-access broadcast digital video signal receiving system 102B according to the present invention is illustrated in FIG. 3. Receiving system 102B differs from aforedescribed receiving system 102A in that receiving system 102B stores access-control signals and video signals in the same storage medium 40 of storage cassette 104B.

Recording/reproducing section 23B, through head 24, records on storage medium 40 in storage cassette 104B video signals supplied by encipherer 22 and access-control signals supplied by access controller 28B; and also reads previously recorded video signals and previously recorded access-control signals from the storage medium. The reproduced video signals are supplied to decipherer 25 and the reproduced access-control signals are supplied from the recording/reproducing section to access controller 28B. As before, recording/reproducing section 23B is a digital video tape recording/reproducing device (VTR) and storage medium 40 is a video tape; although the storage medium may be a magnetic disc, an optical disc, a magneto-optic disc, a solid-state device, or other recordable medium. It is also preferred that the access-control signals be stored in one or more sub-code regions of the storage medium.

When enabled by access controller 28B, decipherer 25 decrypts, according to an encryption key, encrypted signals reproduced by recording/reproducing section 23B. It is contemplated that the encryption key is prestored in the decipherer or is supplied thereto by access controller 28B, or is included in the video signals or the access-control signals supplied by broadcasting station 101, or is stored in and read from storage medium 40. When disabled, decipherer 25 passes video signals from recording/reproducing section 23B directly to decoder 26 without decrypting such signals.

As a function of the signals supplied to access controller 28B by clock 27, user interface 30, modem 31, and recording/reproducing section 23B, the access controller controls the operation of encipherer 22 and decipherer 25 as has been described previously. Specifically, depending upon whether applicable conditions have been fulfilled, the access controller enables or disables the operation of encipherer 22 and decipherer 25.

Each signal transfer sequence, including variations thereon, described above with respect to receiving system 102A is also implemented in similar modes of operation of receiving system 102B. It will be appreciated, then, that the modes of operation of receiving system 102B are substantially identical to the modes of operation of receiving system 102A with the following illustrative exceptions. Access controller 28B functions in the same manner as access controller 28A, except that access-control signals are stored, through recording/reproducing section 23B, in storage medium 40, instead of in a separate access condition memory. Recording/reproducing section 23B functions in the same manner as section 23A except that section 23B additionally records access-control signals on and reproduces access-control signals from storage medium 40. The reproduced access-control signals are supplied from recording/reproducing section 23B to access controller 28B.

Similar to the alternate embodiment discussed in conjunction with FIG. 2, an alternate embodiment of receiving system 102B additionally includes a connection between descrambler 21A and access controller 28B so that scrambled access-control signals that are transmitted by broadcasting station 101 along with the video signals are descrambled and supplied to the access controller. Of course, access controller 28B uses these access-control signals in the same manner as discussed above.

Figure 4:
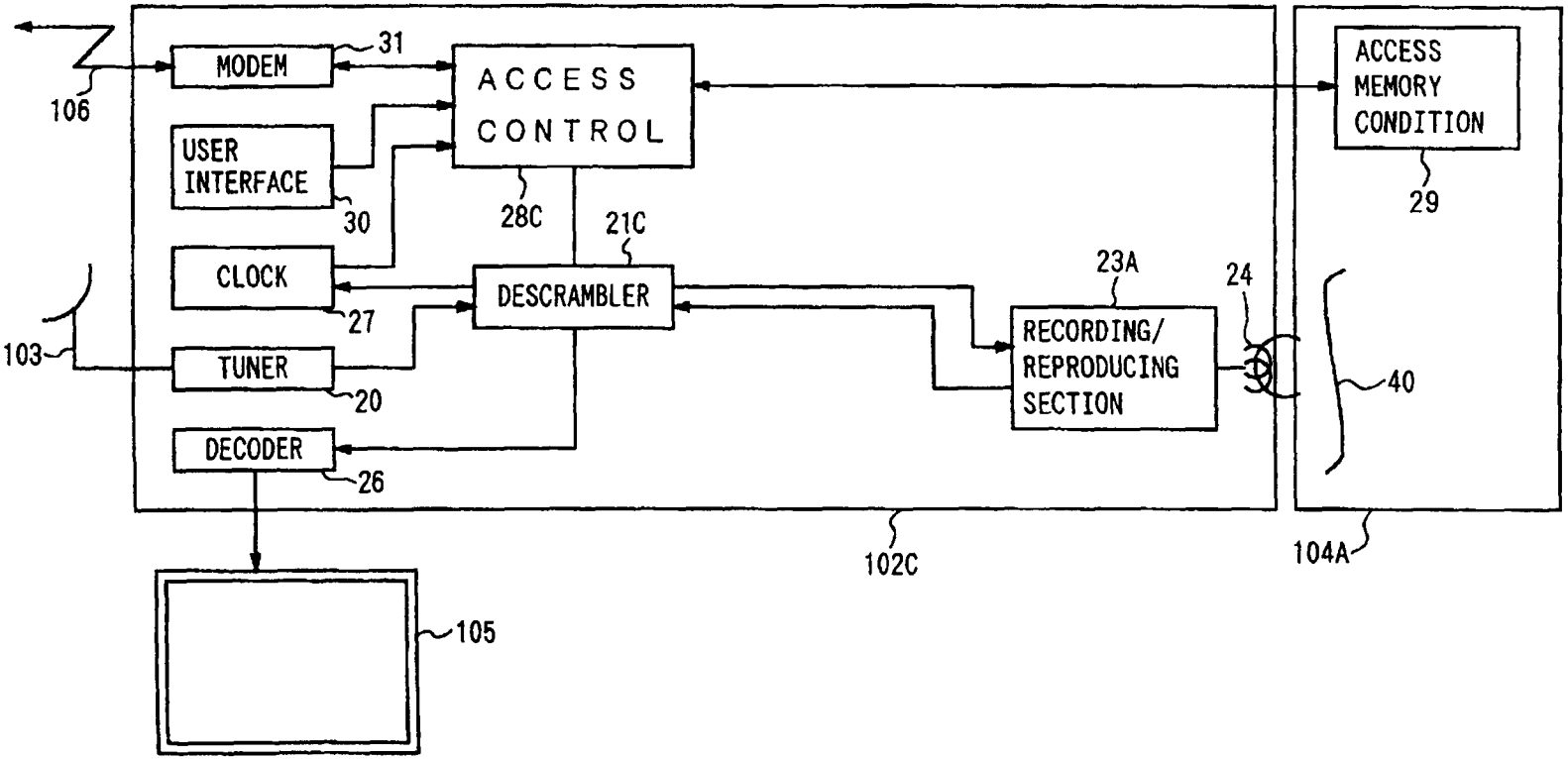
FIG. 4 is a block diagram of a controlled-access broadcast digital video signal receiving system according to a further embodiment of the present invention.

A further embodiment of the controlled-access broadcast digital video signal receiving system 102C according to the present invention is illustrated in FIG. 4. Receiving system 102C, is adapted for receiving, descrambling, decoding, recording, and reproducing digital video signals and is similar to the aforedescribed receiving system 102A of FIG. 2. As in receiving system 102A, receiving system 102C stores access-control signals in access condition memory 29 of storage cassette 104A, while the video signals are stored on storage medium 40 of the storage cassette.

FIG. 4 differs from FIG. 2 in that descrambler 21C of receiving system 102C is coupled to access controller 28C, recording/reproducing section 23A, and decoder 26; and encipherer 22 and decipherer 25 are not provided as separate circuits. When enabled by access controller 28C, descrambler 21C descrambles video signals supplied by tuner 20 and supplies an unscrambled version of the digital video signals to recording/reproducing section 23A. Also, when enabled by the access controller, descrambler 21C descrambles video signals reproduced by recording/reproducing section 23A and supplies an unscrambled version of the digital video signals to decoder 26. When disabled by access controller 28C, descrambler 21C passes scrambled video signals from tuner 20 directly, without encryption, to section 23A and also passes video signals reproduced by the recording/reproducing section directly, without decryption, to decoder 26. Scrambled video signals can be recorded but they cannot be displayed in scrambled form.

It will be appreciated that access controller 28C functions in the same general manner as access controller 28A, except that descrambler 21C is controlled in accordance with the access-control signals rather than encipherer 22 and decipherer 25.

At those aforedescribed operational steps where access controller 28A enables encipherer 22, access controller 28C disables descrambler 21C to pass scrambled signals to the recording/reproducing section; and where access controller 28A disables encipherer 22, access controller 28C enables descrambler 21C to supply descrambled signals to the recording/reproducing section. However, in the operational steps where access controller 28A enables decipherer 25, access controller 28C similarly enables descrambler 21C to descramble the signals reproduced by the recording/reproducing section. Where access controller 28A disables decipherer 25, access controller 28C similarly disables descrambler 21C to pass to decoder 26 signals reproduced by the recording/reproducing section.

In an alternate embodiment of receiving system 102C, access-control signals, transmitted by broadcasting station 101 along with video signals, are received through antenna 103 and supplied by tuner 20 to descrambler 21C for descrambling and for coupling to access controller 28C.

Figure 5:
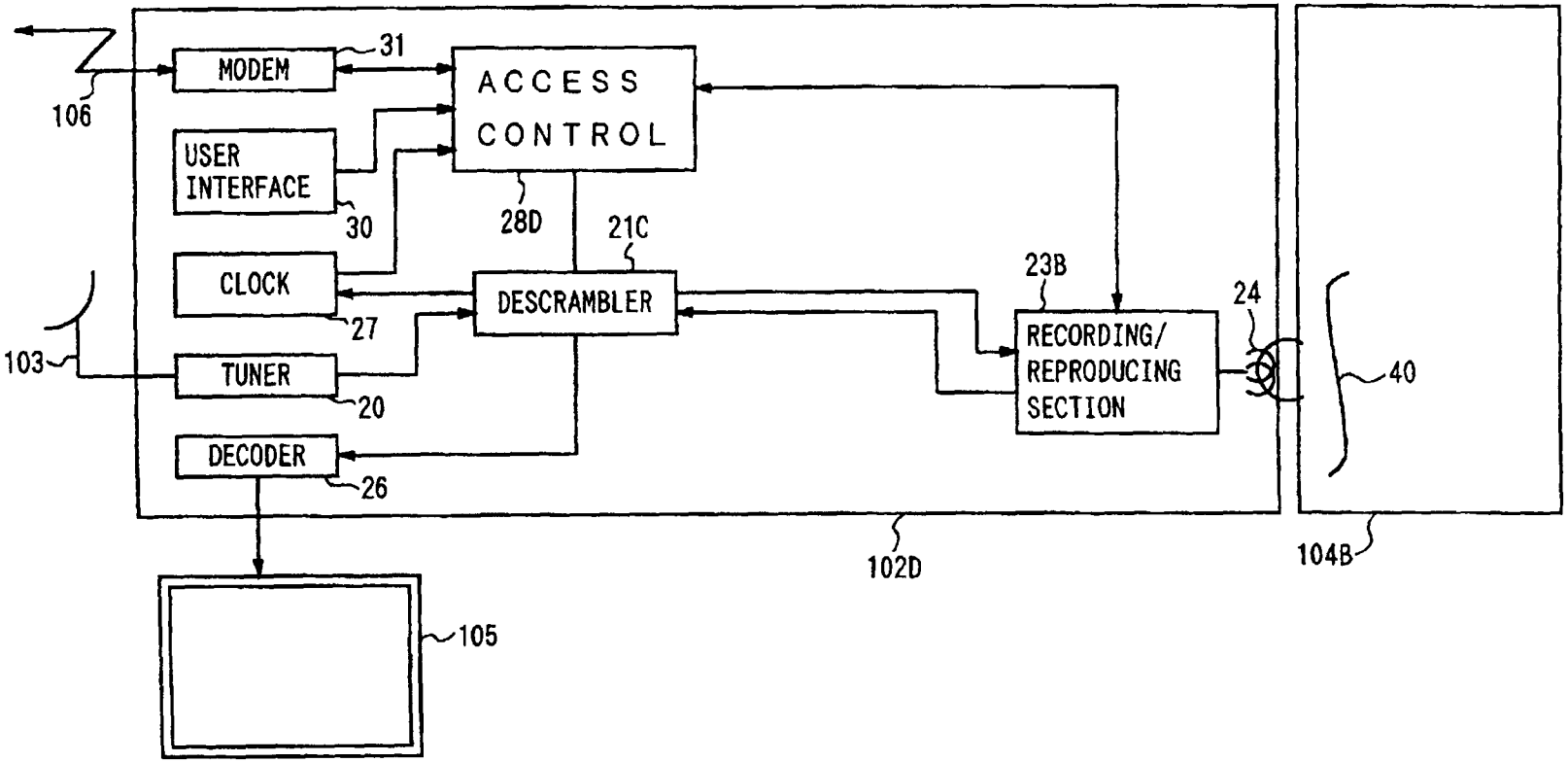
FIG. 5 is a block diagram of a controlled-access broadcast digital video signal receiving system according to yet another embodiment of the present invention.

A still further embodiment of the controlled-access broadcast digital video signal receiving system 102D according to the present invention is illustrated in FIG. 5. Receiving system 102D is seen to be a combination of portions of receiving system 102C and receiving system 102B (FIG. 3). Similar to receiving system 102B, receiving system 102D stores access-control signals and video signals in the same storage medium 40 of storage cassette 104B. Recording/reproducing section 23B supplies the reproduced video signals to descrambler 21C and supplies the reproduced access-control signals to access controller 28D.

It will be appreciated that the modes of operation of receiving system 102D are substantially similar to the modes of operation of receiving system 102C with the following illustrative exceptions. Access controller 28D functions in the same manner as access controller 28C, except that access-control signals are stored in storage medium 40 instead of in a separate access condition memory. Recording/reproducing section 23B functions in the same manna as section 23A except that section 23B additionally records access-control signals on and reproduces access-control signals from storage medium 40. The reproduced access-control signals are supplied from recording/reproducing section 23B to access controller 28D.

Similar to the alternate embodiment discussed in conjunction with FIG. 4, access-control signals, transmitted by broadcasting station 101 along with video signals, are received through antenna 103 and supplied by tuner 20 to descrambler 21C for descrambling; and the descrambled access-control signals are supplied to access controller 28D. It is seen that access controller 28D receives access-control signals from recording/reproducing section 23B and either from modem 31 or from descrambler 21C, or from both.

Figure 6:
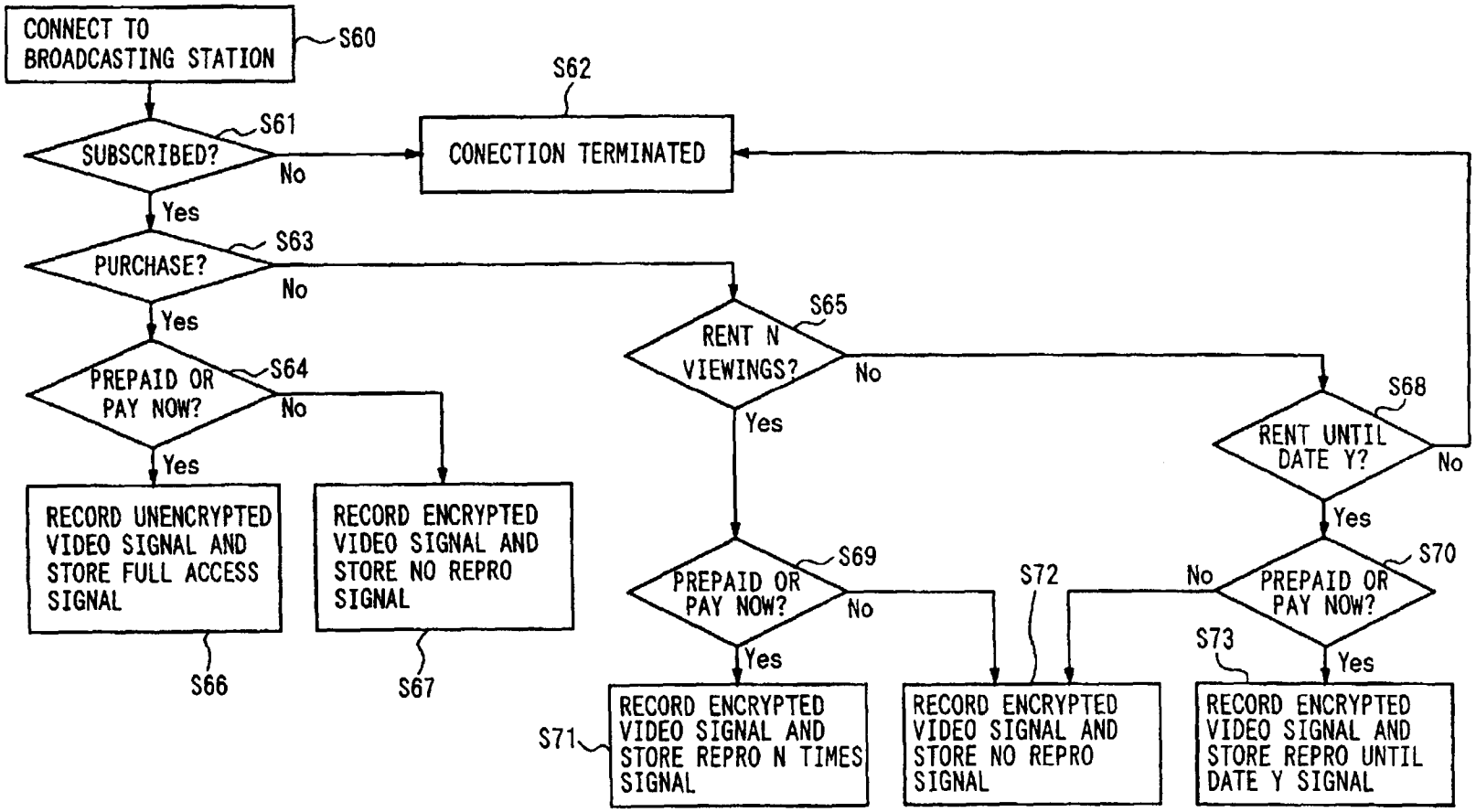
FIG. 6 is a flow diagram illustrating a communication and processing operation controlled by the controller of the controlled-access broadcast digital video signal receiving system of FIG. 2.

FIG. 6 is a flow diagram of a preferred mode of operation of receiving system 102A of FIG. 2, as controlled by access controller 28A, wherein a user orders from a broadcaster a limited or an unlimited right (as may be desired) to reproduce a video program. The user initiates the process by entering a request for a particular video program at user interface 30. The process begins at step S60, where access controller 28A causes modem 31 to connect to broadcasting station 101.

Access controller 28A transmits identification information through modem 31 and communication link 106 to broadcasting station 101 which checks the identification information against a subscription list and determines whether the user has subscribed to the broadcasting station's service, as represented by inquiry S61. If the user is not subscribed, the broadcasting station terminates the connection with receiving system 102A in step S62.

If the user is subscribed, inquiry S61 is answered in the affirmative and operation continues to inquiry S63, which polls the user to determine whether or not the video program is to be purchased. If the user enters an affirmative response into user interface 30, operation proceeds to inquiry S64. Otherwise, operation proceeds to inquiry S65.

At inquiry S64, the broadcasting station 101 determines whether the user has prepaid for the video program and if not, the user is further queried to determine if payment will be made at that time. If the price of the video program has been previously paid or is immediately paid, then processing proceeds with step S66. Otherwise, processing proceeds with step S67.

In step S66, broadcasting station 101 transmits the video program via satellite to antenna 103 and transmits the FULL ACCESS signal via communication link 106 and modem 31 to access controller 28A. Access controller 28A disables encipherer 22, allowing the video program to be recorded in an unencrypted form on storage medium 40, and the access controller also stores the FULL ACCESS signal in access condition memory 29.

In step S67, broadcasting station 101 transmits the video program via satellite to antenna 103 and transmits the NO REPRO signal via communication link 106 and modem 31 to access controller 28A. The access controller enables encipherer 22, causing the video program to be encrypted and then recorded in encrypted form on storage medium 40, and the NO REPRO signal is stored in access condition memory 29.

If the video program is not to be purchased, resulting in a negative answer to inquiry S63, the operation proceeds to inquiry S65 whereat the user is polled to determine whether the video program is to be rented for a number (N) of viewings. If the user enters an affirmative response into user interface 30, the number N is entered, and operation proceeds to inquiry S69. Otherwise, operation proceeds to inquiry S68.

At inquiry S69, the broadcasting station 101 determines whether the user has prepaid for the N viewings of the video program and if not, the user is further queried to determine if payment will be made at that time. If the fee for N viewings of the video program has been previously paid or is immediately paid, processing proceeds with step S71. Otherwise, processing proceeds with step S72.

In step S71, broadcasting station 101 transmits the video program via satellite to antenna 103 and transmits the REPRO N TIMES signal via communication link 106 and modem 31 to access controller 28A. The access controller 28A enables encipherer 22, causing the video program to be encrypted and then recorded on storage medium 40; and the REPRO N TIMES signal is stored in access condition memory 29.

In step S72, broadcasting station 101 transmits the video program via satellite to antenna 103 and transmits the NO REPRO signal via communication link 106 and modem 31 to access controller 28A. The access controller enables encipherer 22, causing the video program to be encrypted and then recorded on storage medium 40; and the NO REPRO signal is stored in access condition memory 29.

If the video program is not to be rented for N viewings, inquiry S65 is answered in the negative and the operation proceeds to inquiry S68 whereat the user is polled to determine whether a video program is to be rented for viewing until a date Y. If the user enters an affirmative response into user interface 30, the date Y is entered, and operation proceeds to inquiry S70. Otherwise, operation returns step S62, described above.

At inquiry S70, the broadcasting station 101 determines whether the user has prepaid for the rental of the video program until date Y and if not, the user is further queried to determine if payment will be made at that time. If the fee for the rental period has been previously paid or is immediately paid, then processing proceeds with step S73. Otherwise, processing proceeds with step S72, described above.

In step S73, broadcasting station 101 transmits the video program via satellite to antenna 103 and transmits the REPRO UNTIL DATE Y signal via communication link 106 and modem 31 to access controller 28A. The access controller enables encipherer 22, causing the video program to be encrypted and then recorded in encrypted form on storage medium 40. Access controller 28A also stores the REPRO UNTIL DATE Y signal in access condition memory 29.

Figure 7A:
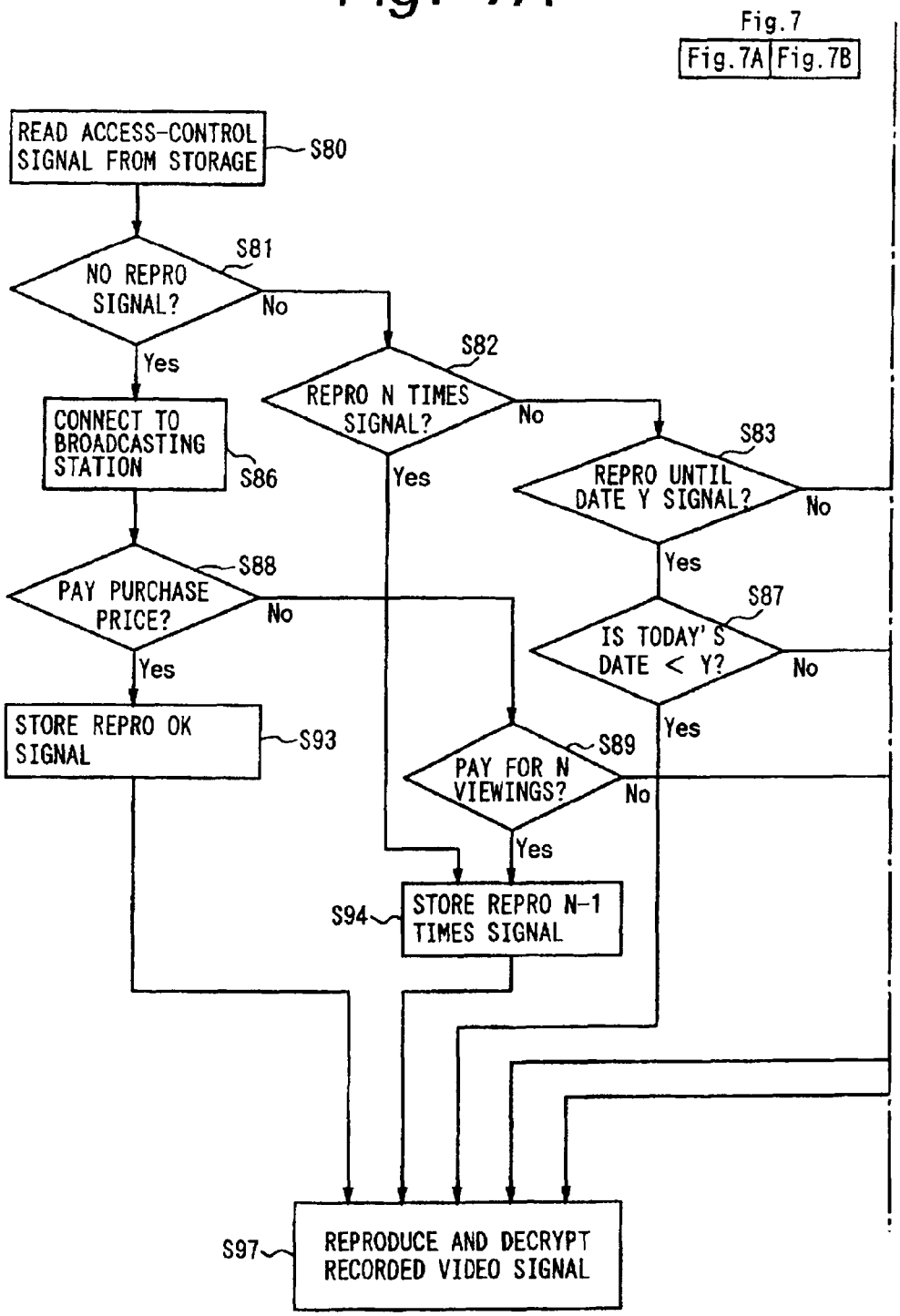
FIG. 7 is another flow diagram illustrating another processing operation controlled by the controller of the controlled-access broadcast digital video signal receiving system of FIG. 2.
Figure 7B:
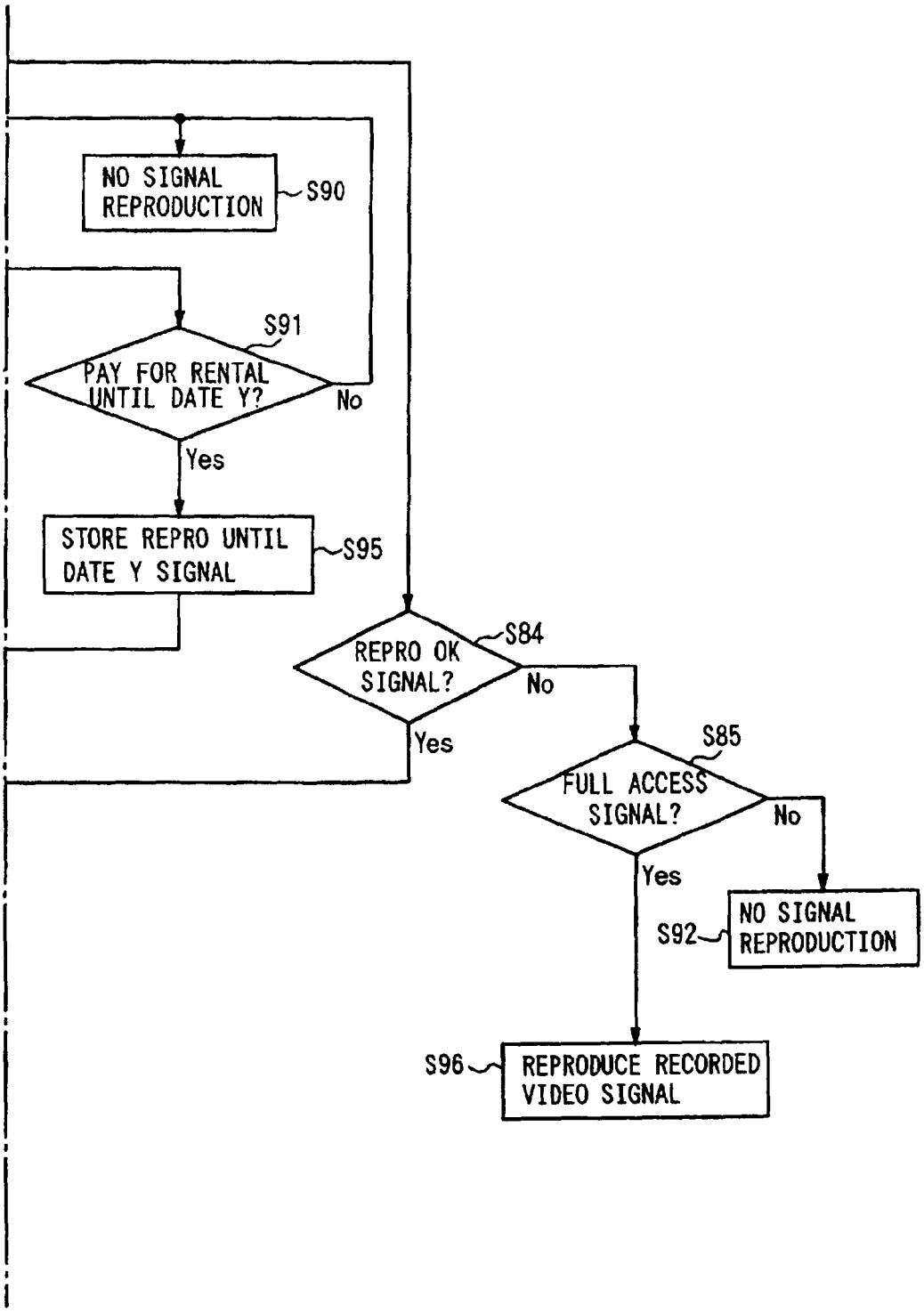

FIG. 7 is a flow diagram of a preferred mode of operation of receiving system 12A of FIG. 2 wherein a user seeks to reproduce a selected previously recorded video program. The user initiates the process by supplying a request to reproduce a prerecorded video program at user interface 30 and the process begins at step S80, where access controller 28A retrieves from access condition memory 29 the access-control signal corresponding to the selected video program. The process proceeds to inquiry S81 whereat the access controller determines if the access-control signal is the NO REPRO signal. If so, processing proceeds with step S86; otherwise, processing proceeds to inquiry S82.

In step S86, access controller 28A causes modem 31 to connect to broadcasting station 101 and transmits identification information and program information to the broadcasting station. Processing then proceeds to inquiry S88 which queries the user to determine if payment of the full purchase price for the video program will be made at that time. If the purchase price of the video program is paid, then processing proceeds with step S93. Otherwise, processing proceeds to inquiry S89.

In step S93, broadcasting station 101 transmits the REPRO OK signal via communication link 106 and modem 31 to access controller 28A which stores the REPRO OK signal in access condition memory 29, replacing the NO REPRO signal, and processing proceeds to step S97. In step S97, the access controller enables decipherer 25; and the selected video program which is reproduced from storage medium 40 is decrypted by decipherer 25, decoded by decoder 26, and supplied for display to video display 105.

If the retrieved access-control signal is not the NO REPRO signal, as represented by a negative answer to inquiry S81, inquiry S82 determines whether the access-control signal is the REPRO N TIMES signal. If so, processing proceeds with step S94. Otherwise, processing proceeds to inquiry S83. In step S94, access controller 28A decrements N by one, debiting the single reproduction which will immediately follow. Further, the REPRO N−1 TIMES signal is stored in access condition memory 29, replacing the access-control signal previously stored there, and processing proceeds to step S97 to reproduce and decrypt the video signal, described above.

If the retrieved access-control signal is not the REPRO N TIMES signal, inquiry S83 is made to determine if the access-control signal is the REPRO UNTIL DATE Y signal. If so, processing proceeds to inquiry S87. Otherwise, processing proceeds to inquiry S84. Inquiry S87 compares the date signal supplied by clock 27, indicating the current date, with date Y. If the current date is prior to date Y, then processing proceeds to step S97, described above. Otherwise, processing proceeds to step S90, whereat access controller 28A determines that the applicable condition has not been satisfied and therefore no video signal reproduction is authorized. The access controller thereafter terminates the connection with broadcasting station 101.

If the retrieved access-control signal is neither the NO REPRO nor the REPRO N TIMES nor the REPRO UNTIL DATE Y signal, inquiry S84 determines if the access-control signal is the REPRO OK signal. If it is, processing proceeds with step S97, described above. Otherwise, processing advances to inquiry S85 whereat access controller 28A determines if the access-control signal is the FULL ACCESS signal. If so, processing proceeds with step S96. Otherwise, processing proceeds with step S92.

In step S92, access controller 28A determines that it has failed to recognize the particular access-control signal stored in condition access memory 29, if any. Lacking a recognizable access-control signal, no video signal reproduction is authorized. Access controller 28A terminates the connection with broadcasting station 101. It should be appreciated that step S92 can be replaced with additional access-control signal definitions to provide further processing and access-control signal permutations.

In step S96, access controller 28A disables decipherer 25, and recording/reproducing section 23A reproduces the selected video program from storage medium 40. The reproduced video program passes through decipherer 25 for decoding by decoder 26, and is supplied to video display 105 for display.

If the retrieved access-control signal is the NO REPRO signal and payment of the full purchase price is not made, inquiry S88 is answered in the negative and the process advances to inquiry S89, which queries the user to determine if the fee for N viewings of the video program will be paid. If the fee for N viewings of the video program is paid, then broadcasting station 101 transmits the REPRO N TIMES signal via communication link 106 and modem 31 to access controller 28A, and processing proceeds with step S94, described above. Otherwise, processing proceeds to inquiry S91 which queries the user to determine if the fee for rental of the video program until date Y will be paid. If the fee for such a rental is paid, then processing proceeds with step S95. Otherwise, processing proceeds with step S90, described above.

In step S95, broadcasting station 101 transmits the REPRO UNTIL DATE Y signal via communication link 106 and modem 31 to access controller 28A which stores the REPRO UNTIL DATE Y signal in access condition memory 29, replacing the NO REPRO signal, and processing proceeds to step S97, described above.

Those of ordinary skill in the art will readily appreciate the modifications to be made to the flow diagrams of FIGS. 6 and 7 to control the operation of the controlled-access broadcast video signal recording systems shown in FIGS. 3, 4 and 5. Hence, in the interest of brevity, further description of such modified flow diagrams is not made.

Although illustrative embodiments of the present invention and modifications thereof have been described in detail herein, it is to be understood that this invention is not limited to these precise embodiments and modifications, and that other modifications and variations may be effected therein by one skilled in the art without departing from the scope and spirit of the invention as defined by the appended claims. For example, it is contemplated that a broadcast video program can be processed by an apparatus according to the present invention for display to a user without a preceding or simultaneous recording of the video program.

What is claimed is:

[1. Apparatus for receiving, recording, and reproducing data signals, comprising:

receiving means for receiving said data signals and an access-control signal generated by a remote provider which grants users rights to reproduce said data signals;

processing means, coupled to said receiving means, for processing said data signals to produce processed data signals;

control means for controlling said processing means in response to said access-control signal;

storage means for storing said processed data signals and for storing said access-control signal;

means for reproducing said stored processed data signals to produce reproduced data signals and for retrieving said stored access-control signal; and reprocessing means coupled to said control means for reprocessing said reproduced data signals in response to said retrieved access-control signal.]

[2. Apparatus according to claim 1 wherein said data signals are digital video data signals.]

[3. Apparatus according to claim 1 wherein said receiving means receives said data signals and said access-control signal from a broadcasting station.]

[4. Apparatus according to claim 1 wherein said receiving means further comprises a tuner for receiving broadcast signals.]

[5. Apparatus according to claim 4 wherein said receiving means further comprises a modem for receiving said access-control signal.]

[6. Apparatus according to claim 1 wherein said receiving means further comprises a modem for receiving said access-control signal.]

[7. Apparatus according to claim 1 wherein said receiving means further comprises a user interface for receiving said access-control signal from a user.]

[8. Apparatus according to claim 1 wherein said processing means comprises a descrambler.]

[9. Apparatus according to claim 1 wherein said processing means comprises a descrambler and an encipherer and wherein said reprocessing means comprises a decipherer.]

[10. Apparatus according to claim 1 wherein said processing means comprises an encipherer and wherein said reprocessing means comprises a decipherer.]

[11. Apparatus according to claim 1 wherein said processed data signals are stored on a record medium and said access-control signal is stored in a separate storage medium.]

[12. Apparatus according to claim 11 wherein said record medium is a video tape.]

[13. Apparatus according to claim 11 wherein said separate storage medium is an integrated circuit memory.]

[14. Apparatus according to claim 1 wherein said processed data signals and said access-control signal both are stored on a common record medium.]

[15. Apparatus according to claim 1 further comprising a clock, coupled to said receiving means and to said control means, for supplying a clock signal to said control means;

wherein said data signals include a clock reference signal; and wherein said clock signal is synchronized with said clock reference signal.]

[16. Apparatus according to claim 1 further comprising a decoder, coupled to said reprocessing means, for decoding said reprocessed data signals.]

[17. Apparatus for receiving and recording data signals, comprising:

receiving means for receiving said data signals and an access-control signal generated by a remote provider which grants users rights to reproduce said data signals;

processing means, coupled to said receiving means, for processing said data signals to produce processed data signals;

control means for controlling said processing means in response to said access-control signal; and storage means for storing said processed data signals and said access-control signal.]

[18. Apparatus according to claim 17 wherein said processing means comprises a descrambler.]

[19. Apparatus according to claim 18 wherein said processing means further comprises an encipherer.]

[20. Apparatus according to claim 17 wherein said processing means comprises an encipherer.]

[21. Apparatus according to claim 17 wherein said storage means comprises a storage cassette.]

[22. Apparatus according to claim 21 wherein said storage cassette contains a record medium on which said processed data signals are recorded and an integrated circuit memory in which said access-control signal is stored.]

[23. Apparatus for reproducing processed data signals, comprising:

means for reproducing stored processed data signals to produce reproduced data signals and for retrieving a stored access-control signal generated by a remote provider which grants users rights to reproduce said data signals;

reprocessing means for reprocessing said reproduced data signals to produce reprocessed data signals; and control means for controlling said reprocessing means in response to said retrieved access-control signal.]

[24. Apparatus according to claim 23 wherein said reprocessing means comprises a descrambler.]

[25. Apparatus according to claim 23 wherein said reprocessing means comprises a decipherer.]

[26. Apparatus according to claim 23 wherein said processed data signals and said access-control signals are stored in a storage cassette.]

[27. A method for transferring from a broadcaster to a receiver a limited reproduction right in data, comprising the steps of:

transmitting from said broadcaster to said receiver an access-control signal generated by a remote provider and said data, said access-control signal indicating said limited reproduction right;

receiving, at said receiver, said access-control signal and said data;

processing, at said receiver, said data in response to said access-control signal to produce processed data;

storing, at said receiver, said processed data and said access-control signal;

retrieving, at said receiver, said stored access-control signal;

reproducing, at said receiver, said stored processed data to produce reproduced data; and reprocessing, at said receiver, said reproduced data in response to said retrieved access-control signal.]

[28. The method, according to claim 27, wherein said limited reproduction right is the right to reproduce said data N times.]

[29. The method, according to claim 27, wherein said limited reproduction right is the right to reproduce said data until date Y.]

[30. The method, according to claim 27, wherein said limited reproduction right is the right to reproduce said data until time T.]

[31. The method, according to claim 27, wherein said data is transmitted in scrambled form and said step of processing said data comprises descrambling said data.]

[32. The method, according to claim 31, wherein said step of processing said data further comprises enciphering said data; and wherein said step of reprocessing said reproduced data comprises deciphering said reproduced data.]

[33. The method, according to claim 27, wherein said step of processing said data comprises enciphering said data; and wherein said step of reprocessing said reproduced data comprises deciphering said reproduced data.]

[34. The method, according to claim 27, wherein said data is transmitted and stored in scrambled form, and said step of reprocessing said reproduced data comprises descrambling said reproduced data.]

[35. The method, according to claim 27, wherein said processed data and said access-control signal are stored on a storage cassette.]

[36. A method for transferring from a broadcaster to a receiver a limited reproduction right in prerecorded data, comprising the steps of:

transmitting from said broadcaster to said receiver an access-control signal generated by a remote provider, said access-control signal indicating said limited reproduction right;

receiving, at said receiver, said access-control signal;

reproducing, at said receiver, said prerecorded data; and processing, at said receiver, said reproduced data in response to said access-control signal.]

[37. The method, according to claim 36, wherein said step of processing said reproduced data comprises deciphering said reproduced data.]

[38. The method, according to claim 36, wherein said step of processing said reproduced data comprises descrambling said reproduced data.]

[39. A method for reproducing prerecorded data comprising the steps of:

reproducing an access-control signal generated by a remote provider which grants users rights to reproduce said data signals from a first storage medium;

reproducing processed data from a second storage medium in response to said access-control signal to produce reproduced data; and reprocessing said reproduced data in response to said access-control signal.]

[40. A method for erasing prerecorded data stored on a record medium in response to an access-control signal stored in a separate memory, comprising the steps of:

retrieving said access-control signal from said separate memory;

determining that said access-control signal is an ERASE signal; and erasing data stored on said record medium in response to said ERASE signal.]

*41. Method comprising the steps of:*

*receiving information in scrambled or coded form;*

*receiving, at a device, access control signal generated by a remote provider which grants a user rights to reproduce the information;*

*descrambling or decoding the information;*

*modifying the information with a key at a device to prevent unauthorized use thereof;*

*providing the modified information to a storage usable externally from the device; and*

*providing said key to said device for modifying the information.*

*42. The method according to claim 41, further comprising the step of providing the access control signal to the storage.*

*43. The method according to claim 42, wherein the access control signal is able to represent a numerical limit to reproduce the information and temporal limit to reproduce the information.*

*44. Apparatus comprising:*

*a receiver for receiving information in scrambled or coded form, and for receiving an access control signal generated by a remote provider which grants a user rights to reproduce the information;*

*a unit for descrambling or decoding the information;*

*a modifying unit that modifies the information with a key at a device to prevent unauthorized use thereof;*

*a writing apparatus for writing the modified information to a storage medium usable externally from the information processing apparatus and for writing to said storage medium said key to modify the information.*

*45. The apparatus according to claim 44, wherein said writing apparatus further writes said access control signal to said storage medium.*

*46. The apparatus according to claim 45, wherein the access control signal represents a numerical limit on the number of times for reproduction of the information and temporal limit on the reproduction of the information.*

*47. Method comprising the steps of:*

*receiving, at a device, information via communication medium;*

*storing said received information in a form to prevent unauthorized use thereof on a storage detachable from the device, and*

*modifying the form of the information subsequently read from the detachable storage according to an access control signal generated by a remote provider which grants a user rights to reproduce the information.*

*48. The method according to claim 47, wherein the form to prevent unauthorized use includes encrypted form.*

*49. The method according to claim 47, wherein the form to prevent unauthorized use includes scrambled form.*

*50. Apparatus comprising:*

*a receiver for receiving information via communication medium;*

*a writing unit for writing to a storage medium detachable from the apparatus said received information in a form to prevent unauthorized use thereof; and*

*a modifier for modifying the form of the information subsequently read from the detachable storage medium according to an access control signal generated by a remote provider which grants a user rights to reproduce the information.*

*51. The apparatus according to claim 50, wherein the form to prevent unauthorized use includes encrypted form.*

*52. The apparatus according to claim 50, wherein the form to prevent unauthorized use includes scrambled form.*

*53. Method comprising the steps of:*

*receiving, at a device, information in a form to prevent unauthorized use thereof;*

*receiving an access control signal generated by a remote provider which grants a user rights to reproduce the information; and*

*writing the received information in said form to prevent unauthorized use to a storage medium that is usable externally from the device.*

*54. The method according to claim 53, further comprising the step of writing the access control signal to the storage medium.*

*55. The method according to claim 54, wherein the access control signal represents a numerical limit for reproduction of the information and a temporal limit for reproduction of the information.*

*56. The method according to claim 53, further comprising the step of writing to the storage medium a key used to put the information into said form to prevent unauthorized use.*

*57. The method according to claim 53, wherein the information is put into said form to prevent unauthorized use using a key.*

*58. The method according to claim 57, wherein the received information is scrambled information.*

*59. Apparatus comprising:*

*a receiver for receiving information in a form to prevent unauthorized use thereof and for receiving an access control signal generated by a remote provider which grants a user rights to reproduce the information; and*

*a writing apparatus for writing the received information in said form to prevent unauthorized use to a storage medium that is usable externally from the device.*

*60. The apparatus according to claim 59, wherein said writing apparatus also writes the access control signal to the storage medium.*

*61. The apparatus according to claim 60, wherein the access control signal represents a numerical limit for reproduction of the information and a temporal limit for reproduction of the information.*

*62. The apparatus according to claim 59, wherein said writing apparatus further writes to the storage medium a key used to put the information into said form to prevent unauthorized use thereof.*

*63. The apparatus according to claim 59, wherein the information is put into said form to prevent unauthorized use using a key.*

*64. The apparatus according to claim 63, wherein the received information is scrambled information.*

*65. Apparatus comprising:*

*a receiver for receiving an access control signal generated by a remote provider which grants a user rights to reproduce information;*

*a storage medium detachably coupled to the apparatus and being usable externally from the apparatus;*

*a controller for controlling operation of the information processing apparatus;*

*a modifying unit connected to the controller for modifying information to prevent unauthorized use thereof;*

*an unmodifying unit connected to the controller for removing modifications to said information that prevent unauthorized use; and*

*a decoder for decoding information.*

*66. The apparatus according to claim 65, wherein said unmodifying unit is supplied with information stored on the storage medium.*

*67. The apparatus according to claim 65, wherein the modifying unit modifies the information using a key.*

*68. The apparatus according to claim 67, wherein the modifying unit encrypts the information.*

*69. The apparatus according to claim 65, wherein the unmodifying unit removes modifications to the information using a key.*

*70. The apparatus according to claim 69, wherein the unmodifying unit descrambles the information.*

*71. The apparatus according to claim 69, wherein the unmodifying unit decrypts the information.*

*72. A method comprising the steps of:*

*reproducing from a storage medium detachably coupled to a device information in a form to prevent unauthorized use thereof;*

*receiving, via said communication medium, an access control signal generated by a remote provider which grants a user rights to reproduce the information; and*

*altering the form of the information stored on the storage medium according to the access control signal.*

*73. The method according to claim 72, wherein the access control signal represents the number of times the information can be used or a temporal limit on when the information can be used.*

*74. The method according to claim 72, further comprising the step of receiving via said communication medium a key used to put said information in the form to prevent unauthorized use.*

*75. The method according to claim 72, further comprising the step of storing an access control signal on the storage medium before connecting to the remote site via the communication medium.*

*76. The method according to claim 72, wherein the form of the information to prevent unauthorized use is encrypted information.*

*77. The method according to claim 72, wherein the form of the information is scrambled information.*

*78. A system, comprising:*

*a storage medium usable externally from said information processing device, said storage medium adapted to store information in a form to prevent unauthorized use thereof;*

*an interface for connecting, via a communication medium, to a provider when information is reproduced from the storage medium, and for receiving an access control signal generated by a remote provider which grants a user rights to reproduce the information; and*

*a unit for altering the form of the information stored on the storage medium according to the access control signal.*

*79. The system according to claim 78, wherein the storage medium is rewritable.*

*80. The system according to claim 78, wherein the access control signal represents the number of times the information can be used or a temporal limit on when the information can be used.*

*81. The system according to claim 78, further comprising a receiver for receiving a key used to put said information in the form to prevent unauthorized use.*

*82. The system according to claim 78, wherein said storage medium stores an access control signal.*

*83. The system according to claim 78, wherein the form of the information to prevent unauthorized use is an encrypted form.*

*84. The system according to claim 78, wherein the form of the information to prevent unauthorized use is a scrambled form.*

*85. A method for playing back prerecorded data comprising the steps of:*

*reproducing an access-control signal generated by a remote provider which grants users rights to play back said data signals from a first storage medium;*

*reproducing processed data from a second storage medium in response to said access-control signal to produce reproduced data, the reproduced data needing modification to enable the user to use said data;*

*modifying said reproduced data in response to said access-control signal; and*

*playing back said modified data in a form enabling the user to use said data.*

*86. The method according to claim 85, wherein said first storage medium and said second storage medium are the same storage medium.*

*87. The method according to claim 86, wherein said first storage medium is a predetermined region of said same storage medium.*

*88. The method according to claim 86, wherein said predetermined region is a sub-code region of said same storage medium.*

*89. The method according to claim 85, wherein said first storage medium is different from said second storage medium.*

*90. The method according to claim 85, wherein said processed data is scrambled data, descrambled data, encrypted data, recorded data or coded data.*

*91. The method according to claim 85, wherein said step of modifying said reproduced data comprises descrambling said reproduced data, decrypting said reproduced data, encrypting said reproduced data or decoding said reproduced data.*

*92. A playback apparatus for playing back prerecorded data, comprising:*

*reading means for reproducing from a first storage medium an access-control signal generated by a remote provider which grants users rights to play back said data signals, and for reproducing processed data from a second storage medium in response to said access-control signal to produce reproduced data;*

*a unit for modifying said reproduced data in response to said access-control signal; and*

*output means for playing back said modified data in a form enabling the user to use said data.*

*93. The playback apparatus according to claim 92, wherein said first storage medium and said second storage medium are the same storage medium.*

*94. The playback apparatus according to claim 93, wherein said first storage medium is a predetermined region of said same storage medium.*

*95. The playback apparatus according to claim 94, wherein said predetermined region is a sub-code region of said same storage medium.*

*96. The playback apparatus according to claim 92, wherein said first storage medium is different from said second storage medium.*

*97. The playback apparatus according to claim 92, wherein said processed data is scrambled data, descrambled data, encrypted data, recorded data or coded data.*

*98. The playback apparatus according to claim 92, wherein said unit either descrambles said reproduced data, decrypts said reproduced data, encrypts said reproduced data or decodes said reproduced data.*

*99. A method for controlling the reproduction of data signals, comprising the steps of:*

*storing data signals received via a signal transmission medium;*

*storing an access control signal received via said signal transmission medium, said access control signal being generated by a remote provider to grant a user rights to reproduce said stored data signals, and said access control signal defining the number of times said stored data signals can be reproduced or a temporal limit on which said stored data signals can be reproduced;*

*reproducing the stored access control signal to determine if said data signals can be reproduced;*

*reproducing said stores data signals depending upon said reproduced access control signal; and*

*outputting to a monitor, in displayable form, said reproduced data signals.*

*100. The method according to claim 99, further comprising the step of encrypting said data signals subsequent to receiving said data signals.*

*101. The method according to claim 99, further comprising the steps of:*

*receiving a time reference signal; and*

*synchronizing clock operation with said time reference signal.*

*102. The method according to claim 99, further comprising the step of receiving a cryptographic key along with said access control signal, wherein said cryptographic key is used to decrypt said data signals.*

*103. The method according to claim 99, further comprising the step of*

*storing said data signals and access control signal in a same storage medium.*

*104. The method according to claim 99, wherein said access control signal includes a second access control signal which defines usage rights of a part of said data signals.*

*105. The method according to claim 99, wherein said access control signal specifies erase timing at which said data signals are erased.*

*106. The method according to claim 99, further comprising the step of receiving said access control signals along with said data signals.*

*107. The method according to claim 99, further comprising the step of decrypting said stored data signals in accordance with said access control signal.*

*108. A reproduction apparatus for controlling the reproduction of data signals, comprising:*

*a writing apparatus for writing data signals received via a signal transmission medium to a storage medium, and for writing an access control signal received via said signal transmission medium to said storage medium, said access control signal being generated by a remote provider to grant a user rights to reproduce said stored data signals, and said access control signal defining the number of times said stored data signals can be reproduced or a temporal limit on which said stored data signals can be reproduced;*

*a reading apparatus for reproducing the stored access control signal to determine if said data signals can be reproduced, and for reproducing said stored data signals depending upon said reproduced access control signal; and*

*output means for outputting to a monitor, in displayable form, said reproduced data signals.*

*109. The reproduction apparatus according to claim 108, further comprising an encryptor for encrypting said data signals subsequent to receiving said data signals.*

*110. The reproduction apparatus according to claim 108, further comprising:*

*a receiver for receiving a time reference signal; and*

*a clock synchronizer for synchronizing clock operation with said time reference signal.*

*111. The reproduction apparatus according to claim 108, further comprising a receiver for receiving a cryptographic key along with said access control signal, wherein said cryptographic key is used to decrypt said data signals.*

*112. The reproduction apparatus according to claim 108, wherein said writing apparatus stores said data signals and access control signal in a same storage medium.*

*113. The reproduction apparatus according to claim 108, wherein said access control signal includes a second access control signal which defines usage rights of a part of said data signals.*

*114. The reproduction apparatus according to claim 108, wherein said access control signal specifies erase timing at which said data signals are erased.*

*115. The reproduction apparatus according to claim 108, wherein said access control signals are received along with said data signals.*

*116. The reproduction apparatus according to claim 108, further comprising a decryptor for decrypting said stored data signals in accordance with said access control signal.*

*117. A method of controlling the use of data signals, comprising the steps of:*

*receiving and storing data signals;*

*receiving and storing a first access control signal generated by a remote site to grant a user rights to use said stored data signals;*

*checking the stored first access control signal prior to processing the stored data signals to determine if said data signals can be used;*

*receiving and storing a second access control signal generated by a remote site to grant a user rights to use said stored data signals if said first access control signal does not grant said user rights to use said stored data signals, said second access control signal defining a temporal limit on which said stored data signals can be used;*

*processing said stored data signals; and*

*outputting said processed data signals.*

*118. The method according to claim 117, further comprising the step of loading a removable storage medium on which said data signals are stored.*

*119. The method according to claim 117, wherein the processing of said data signals is executed at a decoding or descrambling circuit.*

*120. The method according to claim 117, further comprising the step of encoding or scrambling said processed data signals.*

*121. The method according to claim 117, further comprising the step of receiving a cryptographic key along with said data signals wherein said cryptographic key is used to decrypt said data signal.*

*122. The method according to claim 117, wherein the process of receiving said first access control signal is executed separately from the process of receiving said data signals; and said method further comprises the step of receiving a cryptographic key along with said first access control signal.*

*123. The method according to claim 117, further comprising the step of storing said data signal and access control signal in a same storage medium.*

*124. The method according to claim 117, wherein said access control signal includes second access control signal which defines usage of a segment of said data signals.*

*125. The method according to claim 117, wherein said access control signal specifies erase timing at which said data signals are erased.*

*126. The method according to claim 117, wherein said step of processing said data signals comprises descrambling said data signals.*

*127. The method according to claim 117, wherein said step of processing said data signals comprises decrypting said data signals.*

*128. An apparatus for controlling the use of data signals, comprising:*

*a receiver for receiving and storing data signals, and for receiving and storing a first access control signal generated by a remote provider to grant a user rights to use said stored data signals;*

*a controller for checking the stored first access control signal prior to processing the stored data signals to determine if said data signals can be used, said receiver further receiving and storing a second access control signal generated by a remote provider to grant a user rights to use said stored data signals if said first access control signal does not grant said user rights to use said stored data signals, said second access control signal defining the number of times said stored data signals can be used or a temporal limit on which said stored data signals can be used;*

*a processor for processing said stored data signals; and*

*an output controller for outputting said processed data signals.*

*129. The apparatus according to claim 128, further comprising a removable storage medium on which said data signals are stored.*

*130. The apparatus according to claim 128, further comprising a unit for modifying said processed data signals to a form to prevent unauthorized use thereof.*

*131. The apparatus according to claim 128, further comprising a cryptographic key received along with said data signals wherein said cryptographic key is used to decrypt said data signal.*

*132. The apparatus according to claim 128, wherein said first access control signal is received separately from said data signals; and further comprising a cryptographic key received along with said first access control signal.*

*133. The apparatus according to claim 128, wherein said data signal and said access control signals are stored in the same storage medium.*

*134. The apparatus according to claim 128, wherein said access control signal includes second access control signal which defines usage of a segment of said data signals.*

*135. The apparatus according to claim 128, wherein said access control signal specifies erase timing at which said data signals are erased.*

*136. The apparatus according to claim 128, wherein said processor descrambles said data signals.*

*137. The apparatus according to claim 128, wherein said processor decrypts said data signals.*

*138. A method of controlling the reproduction of data signals, comprising the steps of:*

*receiving data signals;*

*storing said received data signals in a form to prevent unauthorized use thereof;*

*receiving a request to reproduce said stored data signals;*

*determining, in response to said received request, whether said stored data signals can be reproduced;*

*connecting to a remote site in response to the determination that said store data signals cannot be reproduced;*

*receiving an access control signal which grants a user rights to reproduce said stored data signals*

*modifying the form of said stored data signals; and*

*reproducing said modified data signals.*

*139. The method according to claim 138, further comprising the step of storing said data signals in a removable storage medium.*

*140. The method according to claim 138, further comprising the step of further processing said modified data signals.*

*141. The method according to claim 138, further comprising the steps of:*

*receiving a time reference signal; and*

*synchronizing a clock operation with said time reference signal.*

*142. The method according to claim 138, further comprising the step of*

*receiving a cryptographic key along with said data signals, wherein said cryptographic key is used to decrypt said data signal.*

*143. The method according to claim 138, wherein the process of receiving said access control signal is executed separately from the process of receiving said data signals, said method further comprising the step of receiving a cryptographic key along with said access control signal.*

*144. The method according to claim 138, further comprising the step of storing said data signal and access control signal in a same storage medium.*

*145. The method according to claim 138, wherein said access control signal includes a second access control signal which defines usage of a segment of said data signals.*

*146. The method according to claim 138, wherein said access control signal specifies erase timing at which said data signals are erased.*

*147. The method according to claim 138, wherein said step of modifying said form of said data signals comprises descrambling said data signals.*

*148. The method according to claim 138, wherein said step of modifying said form of said data signals comprises decrypting said data signals.*

*149. An apparatus for controlling the reproduction of data signals, comprising:*

*a receiver for receiving and storing data signals in a form to prevent unauthorized use thereof, and for receiving a request to reproduce said stored data signals;*

*a controller for determining, in response to said received request, whether said stored data signals can be reproduced, said receiver further connecting to a remote location to receive an access control signal generated by a remote provider to grant a user rights to reproduce said control data signals if said stored data signals cannot be reproduced;*

*a unit for modifying the form of said stored data signals; and*

*a reproducing element for reproducing said modified data signals.*

*150. The apparatus according to claim 149, further comprising a removable storage medium for storing said data signals.*

*151. The apparatus according to claim 149, further comprising a processor for further processing said modified data signals.*

*152. The apparatus according to claim 149, further comprising:*

*a time reference signal received by said apparatus; and*

*a clock whose operation is synchronized with said time reference signal.*

*153. The apparatus according to claim 149, further comprising a cryptographic key received along with said data signals, wherein said cryptographic key is used to decrypt said data signal.*

*154. The apparatus according to claim 149, wherein said receiver receives said first access control signal separately from said data signals, and wherein a cryptographic key is received along with said first access control signal.*

*155. The apparatus according to claim 149, wherein said data signal and said access control signals are stored in a same storage medium.*

*156. The apparatus according to claim 149, wherein said access control signal includes a second access control signal which defines usage of a segment of said data signals.*

*157. The apparatus according to claim 149, wherein said access control signal specifies erase timing at which said data signals are erased.*

*158. The apparatus according to claim 149, wherein said unit descrambles said data signals.*

*159. The apparatus according to claim 149, wherein said unit decrypts said data signals.*

*160. A method of controlling access to digital data, comprising the steps of:*

*receiving a request from a user to use digital data;*

*determining whether said user is a subscriber to use said digital data;*

*determining if said request defines the number of times said digital data can be used or a temporal limit on which said digital data can be used; and*

*transmitting to said user an access control signal determined by said request, if said user is determined to be a subscriber, said access control signal being generated to grant said user rights to use said digital data.*

*161. The method of claim 160, wherein said step of transmitting said access control signal to said user is performed only after the terms of payment for said use of said digital data have been satisfied.*

*162. The method of claim 161, wherein said terms of payment are prepayment by said user for the use of said digital data.*

*163. The method of claim 161, wherein said terms of payment are immediate authorization for payment by said user for the use of said digital data.*

*164. The method according to claim 160, further comprising the step of transmitting said digital data along with said access control signal.*

*165. The method according to claim 160, further comprising the step of transmitting a cryptographic key along with said access control signal.*

*166. The method according to claim 165, wherein said cryptographic key is a key used to encrypt or decrypt said digital data.*

*167. The method according to claim 160, wherein said access control signal defines erase timing at which said digital data are erased.*

*168. The method according to claim 160, further comprising the step of determining whether the user has prepayed for a fee corresponding to the identified request.*

*169. The method according to claim 160, further comprising the step of identifying whether said request is a purchase of the digital data.*

*170. The method according to claim 160, further comprising the step of checking said user's payment, wherein if the payment is proper, said access control signal is transmitted.*

*171. An apparatus for controlling access to digital data, comprising:*

*a receiver for receiving a request from a user to use digital data;*

*a controller for determining whether said user is a subscriber to use said digital data, and for determining if said request defines the number of times said digital data can be used or a temporal limit on which said digital data can be used; and*

*a transmitter for transmitting to said user an access control signal determined by said request, if said user is determined to be a subscriber, said access control signal being generated by a remote provider to grant said user rights to use said digital data.*

*172. The apparatus of claim 171, wherein said access control signal is transmitted to said user only after the terms of payment for said use of said digital data are satisfied.*

*173. The apparatus of claim 172, wherein said terms of payment are prepayment by said user for the use of said digital data.*

*174. The apparatus of claim 172, wherein said terms of payment are immediate authorization for payment by said user for the use of said digital data.*

*175. The apparatus according to claim 171, said digital data is transmitted along with said access control signal.*

*176. The apparatus according to claim 171, wherein a cryptographic key is transmitted along with said access control signal.*

*177. The apparatus according to claim 176, wherein said cryptographic key is a key for encrypting or decrypting said digital data.*

*178. The apparatus according to claim 171, wherein said access control signal defines erase timing at which said digital data are erased.*

*179. The apparatus according to claim 171, further comprising a payment determiner for determining whether the user has prepayed for a fee corresponding to the identified request.*

*180. The apparatus according to claim 171, further comprising a request processor for identifying whether said request is a purchase of the digital data.*

*181. The apparatus according to claim 171, further comprising a payment processor for checking said user's payment, wherein if the payment is proper, said access control signal is transmitted.*

*182. A method of erasing stored data signals, comprising the steps of:*

*receiving an access control signal generated by a remote site to grant a user rights to use said stored data signals wherein said access control signal includes an erase control signal which establishes a time on which said stored data signals are to be erased and either a temporal limit on the usage of data signals or a numerical limit on the number of times data signals can be used; and*

*erasing said stored data signals at the time established by said erase control signal.*

*183. The method according to claim 182, wherein said access control signal defines usage rights of a part of the data signals.*

*184. The method according to claim 182, further comprising the steps of:*

*storing said access control signal in a storage medium; and*

*storing a cryptographic key in the same storage medium in which said access control signal is stored.*

*185. The method according to claim 182, further comprising the steps of:*

*receiving said data signals via fiber optic network; and*

*storing said data signals in a solid-state memory.*

*186. The method according to claim 182, further comprising the step of requesting data signals to be transmitted at a later time.*

*187. The method according to claim 186, further comprising the step of preselecting either a type of data signals or data signals provided by a particular data signals supplier.*

*188. An apparatus for erasing stored data signals, comprising:*

*storage medium for storing an erase control signal which establishes a time on which said stored data signals are to be erased and either a temporal limit on the usage of data signals or a numerical limit on the number of times data signals can be used;*

*a receiver for receiving an access control signal generated by a remote provider to grant a user rights to use said stored data signals; and*

*a writer for erasing said stored data signals at the time established by said erase control signal.*

*189. The apparatus according to claim 188, wherein said access control signal defines usage rights of a part of the data signals.*

*190. The apparatus according to claim 188, further comprising a storage medium for storing said access control signal and a cryptographic key.*

*191. The apparatus according to claim 188, further comprising:*

*a fiber optic network for receiving said data signals; and*

*a solid-state memory for storing said data signals.*

*192. The apparatus according to claim 188, further comprising a delayed data requester for requesting data signals to be transmitted at a later time.*

*193. The apparatus according to claim 192, wherein the data signal is preselected as being from a particular type of data signals or provided by a particular data signals supplier.*

*194. A method of controlling the reproduction of data signals, comprising the steps of:*

*receiving and storing data signals;*

*receiving and storing a first access control signal generated by a remote site to grant a user rights to reproduce a selected portion of said stored data signals;*

*enabling reproduction of only said portion of said stored data signals, consistent with said first access control signal;*

*transmitting a request to reproduce at least the remainder of said stored data signals;*

*receiving a second access control signal generated by a remote site in response to said request to grant a user rights to reproduce said stored data signals, said second access control signal defining the number of times said stored data signals can be reproduced and a temporal limit on which said stored data signals can be reproduced; and*

*reproducing said stored data signals consistent with said second access control signal.*

*195. The method according to claim 194, further comprising the steps of:*

*storing said first access control signal in a storage medium; and*

*storing a cryptographic key in the same storage medium in which said first access control signal is stored.*

*196. The method according to claim 194, wherein said data signals are received via a fiber optic network, said method further comprises the step of storing said data signals in a removable solid-state memory.*

*197. The method according to claim 194, further comprising the step of requesting data signals to be transmitted at a later time.*

*198. The method according to claim 197, further comprising the step of preselecting either a type of data signal or data signals provided by a particular data signals supplier.*

*199. An apparatus for controlling the reproduction of data signals, comprising:*

*a receiver for receiving and storing data signals, and for receiving and storing a first access control signal generated by a remote provider to grant a user rights to reproduce a selected portion of said stored data signals;*

*a controller for enabling reproduction of only said portion of said stored data signals, consistent with said first access control signal;*

*a transmitter for transmitting a request to reproduce at least the remainder of said stored data signals, said receiver further receiving a second access control signal generated by a remote provider in response to said request to grant a user rights to reproduce said stored data signals, said second access control signal defining one or more of the number of times said stored data signals can be reproduced and a temporal limit on which said stored data signals can be reproduced; and*

*a reader for reproducing said stored data signals consistent with said second access control signal.*

*200. The apparatus according to claim 199, further comprising a storage medium for storing said first access control signal and a cryptographic key.*

*201. The apparatus according to claim 199, wherein said data signals are received via a fiber optic network, and further comprising a removable solid-state memory for storing said data signals.*

*202. The apparatus according to claim 199, wherein said transmitter transmits a request for data signals to be transmitted at a later time.*

*203. The apparatus according to claim 202, wherein the data signal is preselected from either a particular type of data signals or is provided by a particular data signals supplier.*

*204. A method for controlling access to data signals stored in a form to prevent unauthorized use thereof, comprising the steps of:*

*receiving via a signal transmission medium a first access control signal;*

*receiving, subsequent to the reception of said first access control signal, a second access control signal, said first and second access control signals being generated by a same entity to grant a user rights to access said stored data signals, and said second access control signal representing a temporal limit on which said stored data signals can be accessed;*

*replacing said first access control signal with said subsequently received second access control signal; and*

*outputting said stored data signals if said second access control indicates that said stored data signals can be used.*

*205. The method according to claim 204, further comprising the steps of:*

*receiving a time reference signal; and*

*synchronizing a clock operation with said time reference signal.*

*206. The method according to claim 204, further comprising the step of loading a removable medium on which said data signals are stored.*

*207. The method according to claim 204, further comprising the step of modifying the form of said data signals to enable use thereof by a user.*

*208. The method according to claim 207, further comprising the step of further processing said modified data signals to prevent unauthorized use of the further processed data signals.*

*209. The method according to claim 207, further comprising the step of receiving a cryptographic key along with said access control signal.*

*210. The method according to claim 204 further comprising the step of receiving a cryptographic key along with said data signals, wherein said cryptographic key is used so as to decrypt said data signal.*

*211. An apparatus for controlling access to data signals stored in a form to prevent unauthorized use thereof, comprising:*

*a receiver for receiving via a signal transmission medium a first access control signal, and for receiving, subsequent to the reception of said first access control signal, a second access control signal, said first and second access control signals being generated by a remote provider to grant a user rights to access said stored data signals, and said second access control signal representing a temporal limit on which said stored data signals can be accessed;*

*a controller for replacing said first access control signal with said subsequently received second access control signal prior to using said stored data signals; and*

*a decryptor for decrypting said stored data signals if said second access control signal indicates that said stored data signals can be used.*

*212. The apparatus according to claim 211, wherein said receiver receives a time reference signal; and further comprising a clock whose operation is synchronized with said time reference signal.*

*213. The apparatus according to claim 211, further comprising a removable medium on which said data signals are stored.*

*214. The apparatus according to claim 211, wherein said decryptor modifies said data signals to a form such that a user can use said modified data signals.*

*215. The apparatus according to claim 214, further comprising a processor for processing said modified data signals.*

*216. The apparatus according to claim 214, wherein said receiver receives a cryptographic key along with said access control signal.*

*217. The apparatus according to claim 211, wherein said receiver receives a cryptographic key along with said data signals, wherein said cryptographic key is used so as to decrypt said data signal.*

*218. Method for controlling usage of data comprising:*

*requesting data signals to be transmitted at a later time;*

*receiving via a fiber optic network data signals in a form to prevent unauthorized use thereof;*

*receiving a first access control signal corresponding to said data signals, wherein said first access control signal comprises a second access control signal which defines usage of a segment of said data signals, and wherein said first access control signal is generated by a remote provider which grants users rights to reproduce said data signals;*

*storing said data signals in a solid-state memory;*

*checking said access control signal; and*

*modifying said data signals to a form authorized for use subsequent to checking said access control signal.*

*219. Method according to claim 218, further comprising the step of preselecting the data signal as being a particular type of data signals or provided by a particular data signals supplier.*

*220. An apparatus for controlling reproduction of data signals stored on a recording medium, comprising:*

*a receiver for retrieving an access control signal generated by a remote provider which grants a user rights to reproduce said data signals and which represents the number of times said data signals can be reproduced;*

*a reader for reproducing said data signals from said recording medium wherein said data signals are stored in an encrypted form;*

*a decryptor for decrypting said reproduced data signals; and*

*a controller for controlling the reproduction and decryption of said data signals in response to said retrieved access control signal.*

*221. The apparatus of claim 220, wherein said data signals are compressed signals, and further comprising a decoder for decoding the decrypted data signals.*

*222. The apparatus of claim 220, wherein the access control signal is retrieved over a communication channel.*

*223. The apparatus of claim 220, wherein the access control signal is retrieved by reproducing said access control signal from said recording medium.*

*224. The apparatus of claim 220, wherein the access control signal is rewritable.*

*225. An apparatus for controlling reproduction of data signals stored on a recording medium, comprising:*

*a receiver for retrieving an access control signal generated by a remote provider which grants a user rights to repro-*

*duce said data signals and which represents a temporal limit on which said data signals can be reproduced;*

*a reader for reproducing said data signals from said recording medium, wherein said data signals are stored in an encrypted form;*

*a decryptor for decrypting said reproduced data signals; and*

*a controller for controlling the reproduction and decryption of said data signals in response to said retrieved access control signal.*

*226. The apparatus of claim 225, wherein said data signals include clock reference data for adjusting the time of a clock used in reproducing said data signals.*

*227. The apparatus of claim 225, wherein said data signals are compressed signals, and further comprising a decoder for decoding the decrypted data signals.*

*228. The apparatus of claim 225, wherein the access control signal is retrieved over a communication channel.*

*229. The apparatus of claim 225, wherein the access control signal is retrieved by reproducing said access control signal from said recording medium.*

*230. An apparatus for receiving transferred data signals, comprising:*

*a receiver for receiving said data signals transferred to said apparatus, an access control signal generated by a remote provider and transferred to said apparatus, the access control signal granting a user rights to reproduce said data signals at the apparatus and representing the number of times said data signals can be reproduced, and data signals transferred to the apparatus, and*

*a storage device for storing said received data signals in an encrypted form, and for storing said received access control signal.*

*231. The apparatus of claim 230, wherein said data signals and said access control signal are transferred to said apparatus from the same remote provider.*

*232. The apparatus of claim 230, wherein said data signals and said access control signal are transferred to said apparatus over different communication paths.*

*233. The apparatus of claim 230, wherein said data signals and said access control signal are transferred to said apparatus over the same communication path.*

*234. An apparatus for receiving transferred data signals, comprising:*

*a receiver for receiving said data signals transferred to the apparatus, an access control signal generated by a remote provider and transferred to the apparatus, the access control signal granting a user rights to reproduce said data signals at the apparatus and representing a temporal limit on which said data signals can be reproduced, and data signals transferred to the apparatus; and*

*a storage device for storing said received data signals in an encrypted form and storing said received access control signal.*

*235. The apparatus of claim 234, wherein said data signals and said access control signal are transferred to said apparatus from the same remote provider.*

*236. The apparatus of claim 234, wherein said data signals and said access control signal are transferred to said apparatus over different communication paths.*

*237. The apparatus of claim 234, wherein said data signals and said access control signal are transferred to said apparatus over the same communication path.*

*238. An apparatus for controlling reproduction of data signals stored on a recording medium, comprising:*

*a receiver for retrieving a first access control signal generated by a remote provider and stored on said recording medium together with said data signals, said first access control signal granting a user rights to reproduce the data signals from the recording medium;*

*a writer for rewriting said first access control signal to produce a second access control signal; and*

*a reader for reproducing said data signals from said recording medium.*

*239. The apparatus of claim 238, wherein at least one of said access control signals represents the number of times said data signals can be reproduced.*

*240. An apparatus for transferring data signals, comprising:*

*a receiver for receiving from a user's receiver apparatus a request for a desired data signal, and for receiving from said user's receiver apparatus a request for limited rights to use said requested data signal at the receiver;*

*an access signal provider for providing an access control signal as a function of said requested limited rights; and*

*a transmitter for transferring said requested data signal and said generated access control signal to said receiver, said access control signal controlling an access controller at the user's receiver apparatus to limit the user's receiving apparatus to N uses of said data signal where N>1, or to limit the user's receiver apparatus to use said data signals for only a predetermined time duration.*

*241. An apparatus for receiving data signals, comprising:*

*a transmitter for transmitting a request requesting a desired data signal, and requesting limited rights to use said requested data signal;*

*a receiver for receiving said requested data signal, and receiving an access control signal that is generated by a remote provider as a function of said requested limited rights;*

*a controller for controlling the use of said data signal in response to said received access control signal; and*

*a storage device for storing said received data signal in an encrypted form.*

*242. The apparatus of claim 241, wherein said access control signal represents the number of times said data signals can be used.*

*243. The apparatus of claim 241, wherein said access control signal represents a temporal limit on which said data signals can be used.*

*244. The apparatus of claim 241, wherein said access control signal defines one or more of the number of times said data signals can be used and a temporal limit on which said data signals can be used.*

*245. The apparatus of claim 241, wherein said storage device comprises a fixed storage medium.*

*246. The apparatus of claim 241, wherein controlling the use of said received data signal comprises decrypting said received data signal.*

*247. An apparatus for controlling the reproduction of data signals, comprising:*

*a storage device for storing data signals received via a signal transmission medium, and for storing an access control signal received via said signal transmission medium, said access control signal being generated by a remote provider to grant a user rights to reproduce said stored data signals, and said access control signal defining one or more of the number of times said stored data signals can be reproduced and a temporal limit on which said stored data signals can be reproduced;*

*a controller for checking the stored access control signal prior to reproducing the stored data signals to determine if said data signals are can be reproduced;*

*a reader for reproducing said stored data signals depending upon said access control signal; and*

*an output controller for outputting to a monitor, in recognizable form, said reproduced data signals.*

* * * * *